(12) United States Patent
Isozaki

(10) Patent No.: US 6,301,558 B1
(45) Date of Patent: *Oct. 9, 2001

(54) AUDIO SIGNAL CODING WITH HIERARCHICAL UNEQUAL ERROR PROTECTION OF SUBBANDS

(75) Inventor: Masaaki Isozaki, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/005,963

(22) Filed: Jan. 12, 1998

(30) Foreign Application Priority Data

Jan. 16, 1997 (JP) .................................................. 9-005842

(51) Int. Cl.[7] .................................................. G10L 21/02
(52) U.S. Cl. .......................... 704/228; 704/229; 704/500
(58) Field of Search .................................. 704/228, 229, 704/500

(56) References Cited

U.S. PATENT DOCUMENTS

| | | | | |
|---|---|---|---|---|
| 5,226,084 | * | 7/1993 | Hardwick et al. | 704/219 |
| 5,467,132 | * | 11/1995 | Fazel et al. | 348/390 |
| 5,473,727 | * | 12/1995 | Nishiguchi et al. | 704/222 |
| 5,495,552 | * | 2/1996 | Sugiyama et al. | 704/201 |
| 5,699,481 | * | 12/1997 | Shlomot et al. | 704/228 |
| 5,729,560 | * | 3/1998 | Hagenauer et al. | 714/786 |
| 5,737,718 | * | 4/1998 | Tsutsui | 704/205 |
| 5,740,277 | * | 4/1998 | Katto | 382/232 |
| 5,757,821 | * | 5/1998 | Jamal et al. | 714/746 |
| 5,761,438 | * | 6/1998 | Sasaki | 709/247 |
| 5,761,632 | * | 6/1998 | Stewart et al. | 704/220 |
| 5,825,430 | * | 10/1998 | Adolph et al. | 348/487 |
| 5,974,376 | * | 10/1999 | Hassan et al. | 704/220 |

* cited by examiner

Primary Examiner—Tālivaldis Ivars Šmits
(74) Attorney, Agent, or Firm—Frommer Lawrence & Haug LLP.; William S. Frommer; Dennis M. Smid

(57) ABSTRACT

An audio signal encoding apparatus is constructed by: means for separating an input audio signal into a plurality of hierarchical data on the basis of a frequency; a plurality of encoding means for respectively encoding the plurality of hierarchical data; and error correction encoding means for adding an error correction code to an output of each of the plurality of encoding means, wherein the error correction encoding means raises error correcting ability which is caused by the error correction encoding for the hierarchical data on the low band side among the plurality of hierarchical data than that for the hierarchical data on the high band side. A bit allocation amount may be determined in accordance with a scale factor and a psychological auditory sensation model. Additionally, the busyness degree of a transmission path may be detected and a predetermined band or bands of the hierarchical data to be decoded or used by a reception side may be selected in accordance with the busyness degree.

2 Claims, 20 Drawing Sheets

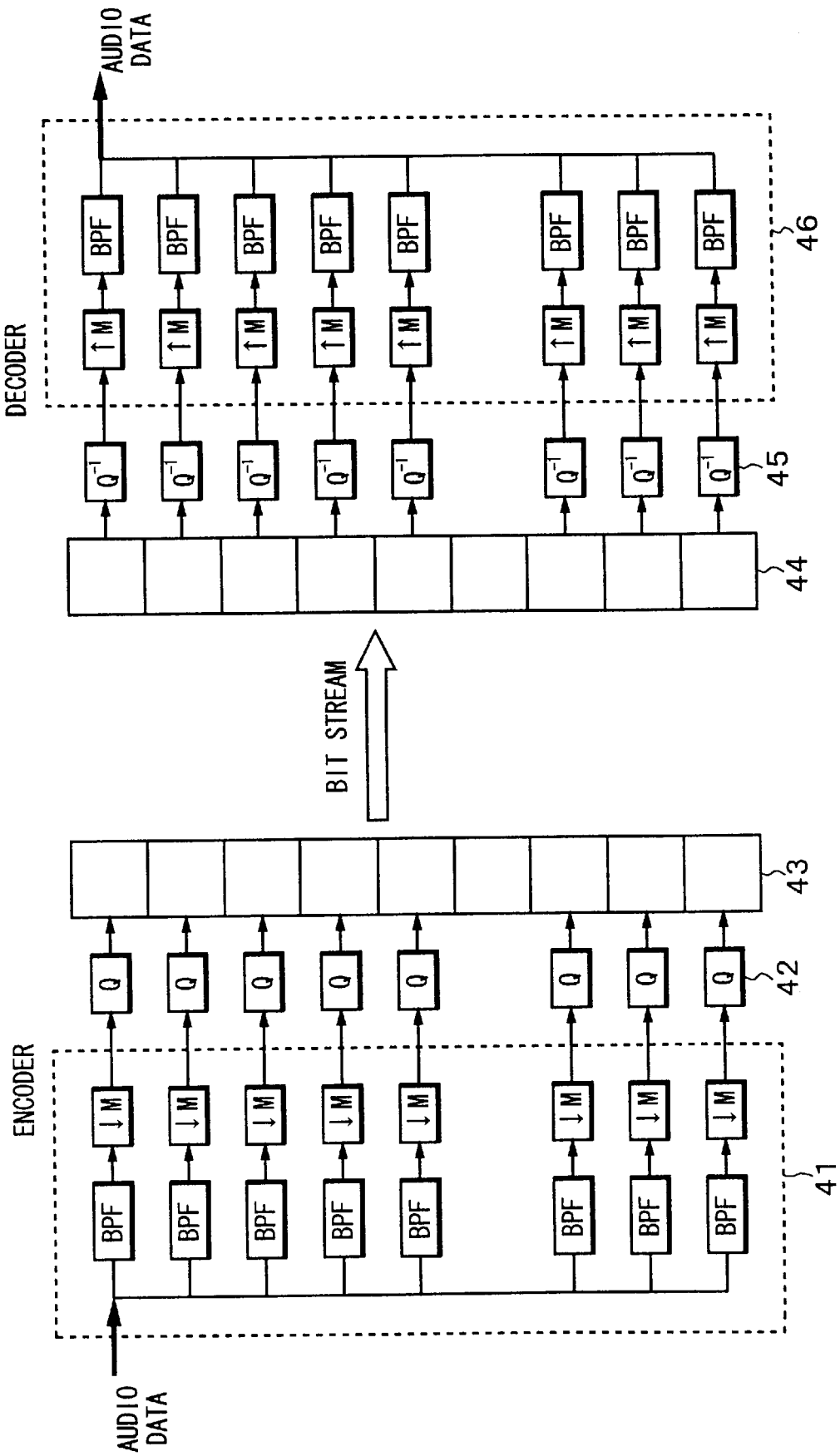

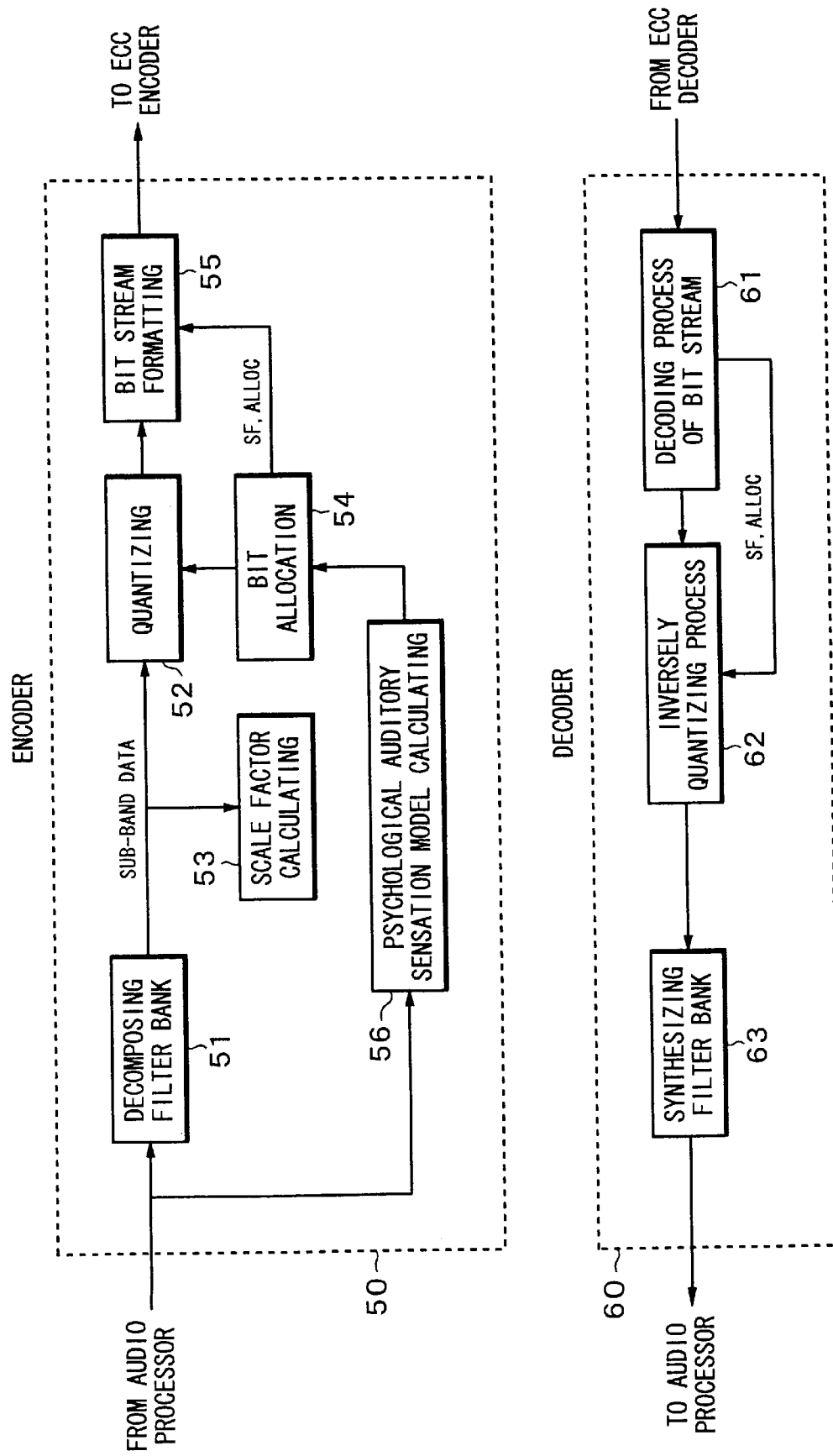

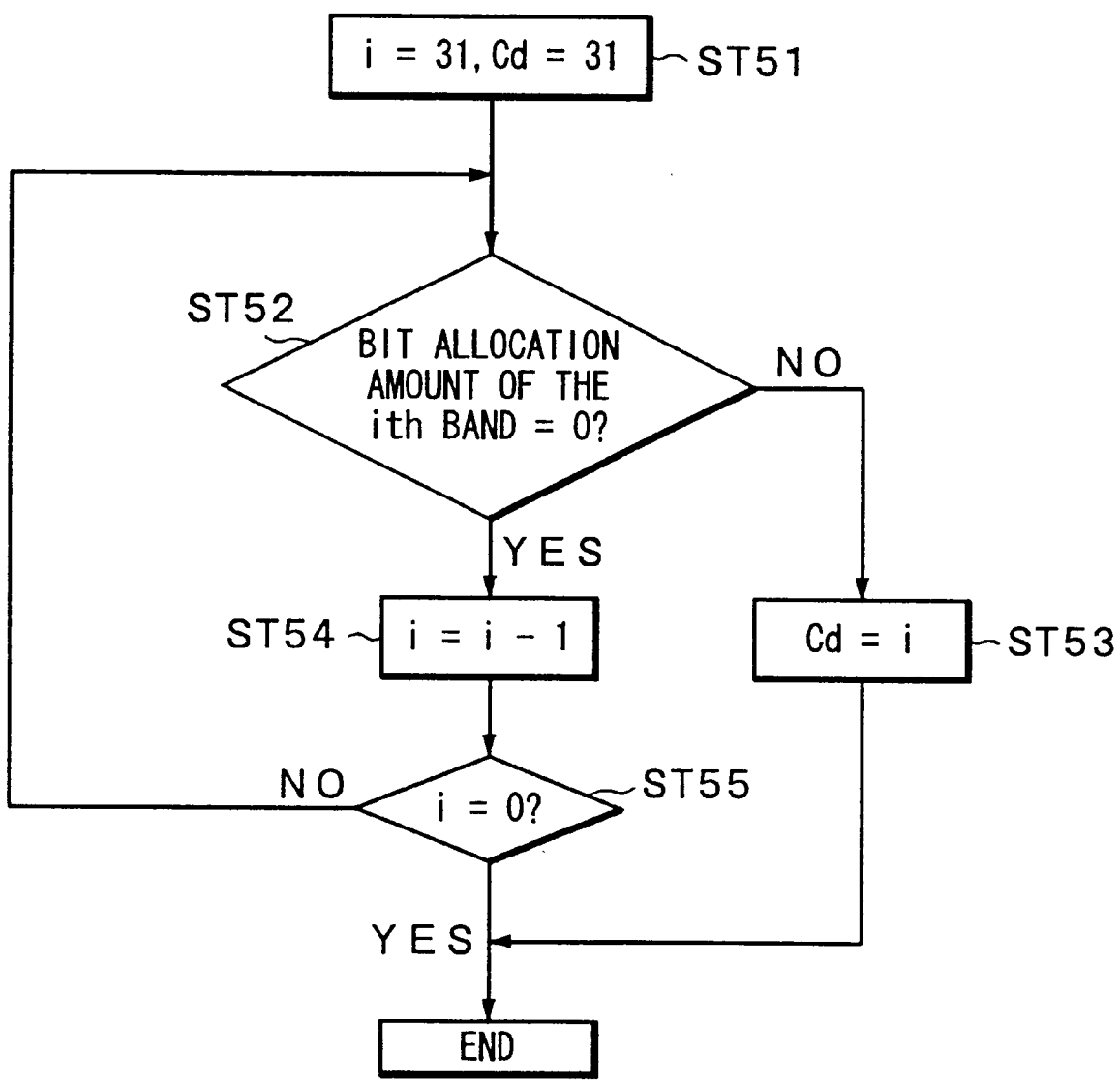

AUDIO SIGNAL CODING WITH HIERARCHICAL UNEQUAL ERROR PROTECTION OF SUBBANDS

BACKGROUND OF THE INVENTION

1. Field of the Invention

The invention relates to an audio signal encoding apparatus and an encoding method and an audio signal decoding apparatus and a decoding method which are applied to transmit a digital audio signal by, for example, a digital satellite broadcasting.

2. Description of the Related Art

A powerful error correction code is used for transmission of information in a digital satellite broadcasting. Therefore, even if a C/N ratio of a transmission path deteriorates to a certain degree, information of substantially the same quality as that of a transmission signal can be received by error correction.

However, if the C/N ratio suddenly deteriorates as in case of a rainy day and if an error generated exceeds error correcting ability which the error correction code has, the quality of reproduced information suddenly deteriorates to such an extent that the contents cannot be understood. On the other hand, in case of an analog broadcasting, a quality of reproduced information gently changes with the decrease in C/N ratio. FIG. 1A conceptually shows the foregoing difference between the digital broadcasting and the analog broadcasting in the case where an axis of abscissa shows an error rate and an axis of ordinate indicates a quality of data that is reproduced. In case of the analog broadcasting, the quality gradually deteriorates as shown by a broken line. In case of the digital broadcasting, the quality suddenly deteriorates as shown by a solid line. Actually, even in case of the digital broadcasting, characteristics (graceful degradation) such that the quality of the reproduction data gradually deteriorates as in the analog broadcasting are preferable.

The transfer of audio data on a network will now be considered. Even if the signal processing abilities on the encoder side and the decoder side have abilities enough to execute real-time processes, when the network is busy and an enough data transfer amount cannot be assured, a reproduction signal cannot be obtained in a real-time manner. In such a case, since a decoding process cannot be performed until a predetermined amount of data is accumulated on the decoder side, a reproduction sound becomes an intermittent sound and a reproduction sound quality remarkably deteriorates. Further, even when data processing ability on the decoder side connected to the network is inadequate, the quality of the reproduction audio sound similarly deteriorates.

OBJECTS AND SUMMARY OF THE INVENTION

It is, therefore, an object of the invention to provide an audio signal encoding apparatus and an encoding method and an audio signal decoding apparatus and a decoding method, in which when a C/N ratio of a transmission path deteriorates, the quality of the reproduced audio signal deteriorates gradually.

That is, according to the invention, as conceptually shown in FIG. 1B, a graceful degradation such that when a C/N ratio of a transmission path deteriorates, the quality of the reproduced audio signal deteriorates step by step is realized even in a digital transmission. In case of transmitting an audio signal, for example, the signal to be transmitted is separated to a middle low band and a high band and encoded, while data in the middle low band wherein quality deterioration is likely to be perceived is transmitted with higher error correcting ability. Thus, when the C/N ratio of the transmission path deteriorates, the signal first deteriorates in the high band component in which noise is more difficult to be perceived. Therefore, the graceful degradation can be realized.

Another object of the invention is to provide an audio signal encoding apparatus and an encoding method and an audio signal decoding apparatus and a decoding method, in which in a real-time reproduction system such that audio data is transmitted on a network, it is prevented that a reproduction sound becomes intermittent in dependence on a state of the network, processing ability on the reproduction side, or the like.

According to one aspect of the invention, there is provided an audio signal encoding apparatus comprising: a unit for separating an input audio signal into a plurality of hierarchical data on a frequency basis; a plurality of encoding units for respectively encoding the plurality of hierarchical data; and an error correction encoding unit for adding an error correction code to an output of each of the plurality of encoding units, wherein the error correction encoding unit raises error correcting ability which is caused by the error correction encoding for the hierarchical data on the low band side among the plurality of hierarchical data than that for the hierarchical data on the high band side.

According to another aspect of the invention, there is also provided an audio signal encoding apparatus comprising: a unit for dividing an input audio signal into a plurality of frequency components on a frequency basis; a quantizing unit for respectively quantizing the plurality of frequency components; and a formatting unit for dividing the plurality of quantized frequency components into blocks of a plurality of hierarchical data and for formatting to a plurality of bit streams every data divided into the blocks.

According to still another aspect of the invention, there is also provided an audio signal encoding apparatus comprising: a unit for separating an input audio signal to a plurality of hierarchical data on the basis of a frequency; a plurality of encoding units for respectively encoding the plurality of hierarchy data; and an error correction encoding unit for adding an error correction code to an output of each of the plurality of encoding units, wherein a busyness degree of a transmission path is detected and the hierarchy data to be used by a reception side which receives the encoded audio signal in accordance with the busyness degree through the transmission path is transmitted to the reception side.

According to another further aspect of the invention, there is provided an audio signal encoding apparatus comprising: a unit for separating an input audio signal to a plurality of hierarchy data on the basis of a frequency; a plurality of encoding units for respectively encoding the plurality of hierarchy data; and an error correction encoding unit for adding an error correction code to an output of each of the Plurality of encoding units, wherein the hierarchy data to be used by a reception side which receives the encoded audio signal through a transmission path is transmitted to the reception side in accordance with processing ability on the reception side.

According to further another aspect of the invention, there is provided a decoding apparatus for receiving and decoding bit streams formed by dividing an audio signal to a plurality of hierarchies in accordance with a frequency and encoding, comprising: a unit for decoding the received bit streams to a plurality of hierarchy data; and a unit for adaptively selecting a whole or a part of the plurality of hierarchy data.

The above and other objects and features of the present invention will become apparent from the following detailed description an e appended claims with reference to the accompanying drawings.

BRIEF DESCRIPTION OF THE DRAWINGS

FIG. 8 is a block diagram showing an example of an encoder and a decoder of sub-band encoding;

FIG. 9 is a block diagram of an encoder and a decoder according to signal processes of the sub-band encoding;

FIG. 21 is a flowchart showing another example of a method of determining a boundary position according to other embodiment of the invention;

DETAILED DESCRIPTION OF THE PREFERRED EMBODIMENTS

Figure 2A:
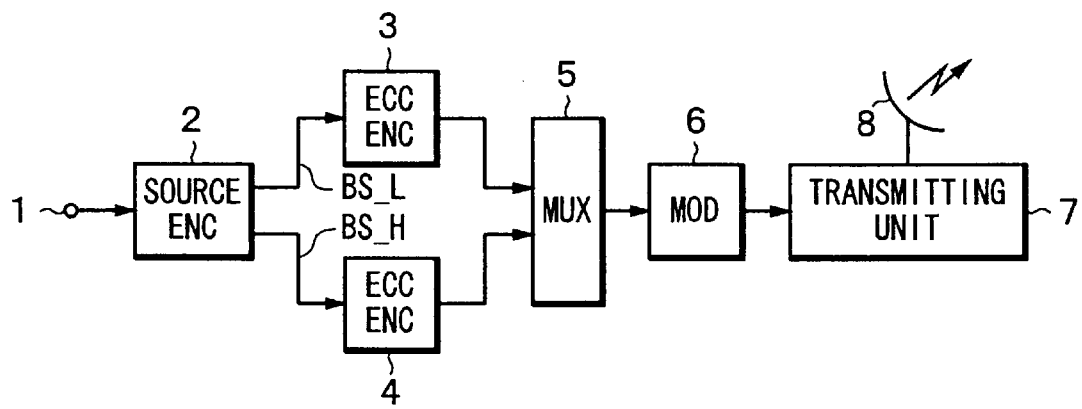
FIGS. 2A and 2B are block diagrams showing constructions on the transmission side and the reception side according to an embodiment of the invention, respectively.
Figure 2B:
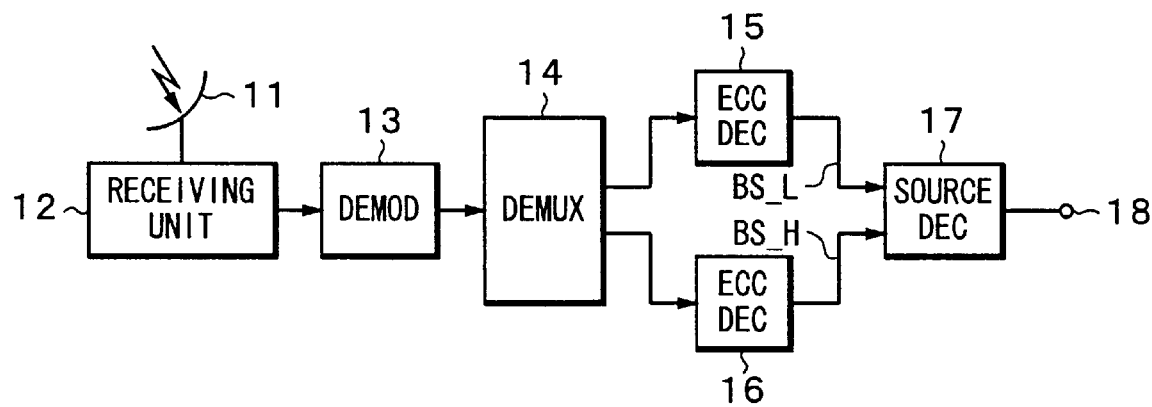

An embodiment in which the invention is applied to a digital broadcasting will now be described hereinbelow with reference to the drawings. FIGS. 2A and 2B show an outline of a system according to the embodiment of the invention. FIG. 2A shows a construction on the transmission side. A digital audio signal to be transmitted is supplied from an input terminal 1. For example, the digital audio signal is formed by converting an audio signal to a digital signal by a sampling frequency 48 kHz. Although the digital audio signal is the signal of one channel, in many cases, actually, the number of channels is equal to or larger than two channels (stereo).

The input digital audio signal is supplied to a source encoder 2. As will be explained hereinafter, the source encoder 2 frequency divides the input digital audio signal to low band and middle band components (simply, referred to as middle low band components) and a high band component and compresses hierarchy data of each frequency component by a compression code [for example, audio encoding based on the MPEG (Moving Picture Experts Group) standard], respectively.

The format itself of the MPEG audio doesn't have a structure such that the signal is hierarchically decoded. In the invention, therefore, the digital audio signal is separated to hierarchy data of a plurality of frequency components and each hierarchy data is encoded by the MPEG audio system. By transmitting a plurality of bit streams formed as mentioned above, the signal can be hierarchically decoded in accordance with a receiving situation, processing ability, or the like. The two hierarchical structures of the middle low band and the high band are provided here.

A bit stream (encoded data) BS_L of the middle low band components and a bit stream (encoded data) BS_H of the high band component are outputted from the source encoder 2. The bit streams are respectively supplied to ECC (error correction code) encoders 3 and 4. The encoding of a error correction code is executed to the bit streams BS_L and BS_H by the ECC encoders 3 and 4, respectively. Output data of the ECC encoders 3 and 4 are supplied to a multiplexer 5, respectively, and one bit stream is formed.

The bit stream is modulated by a modulator 6 and modulated data is supplied to a transmitting unit 7. The modulator 6 is a digital modulator and modulates the transmission data by a system such as QPSK (Quadrature Phase Shift Keying), QAM (Quadrature Amplitude Modulation), VSB (Vestigial Sideband) modulation, or the like. Modulation data is transmitted to a broadcasting satellite (or communicating satellite) by the transmitting unit 7 via a transmitting antenna 8.

FIG. 2B shows a construction on the reception side of the digital broadcasting. The broadcasting radio wave received by a receiving antenna 11 is supplied to a demodulator 13 through a receiving unit 12. A frequency converter, a tuner, and the like are included in the receiving unit 12. The modulation data is supplied to the demodulator 13. As a result of the demodulation in the demodulator 13, a bit stream is outputted from the demodulator 13.

The bit stream is supplied to a demultiplexer 14. The bit stream is separated to a bit stream of the middle low band data and a bit stream of the high band data by the demultiplexer 14. On the bit stream, the bit streams of the two frequency components are arranged at positions according to a predetermined rule. Information indicative of the position of the bit stream of each frequency component on the bit stream is inserted into the bit stream as necessary.

The two bit streams separated by the demultiplexer 14 are supplied to ECC decoders 15 and 16, respectively. In the ECC decoders 15 and 16, errors generated during the transmission are corrected by the error correction code. The errors which cannot be corrected are concealed so as to be inconspicuous when reproducing the signal.

The bit stream BS_L of the middle low band which was received, demodulated, and error corrected is outputted from the ECC decoder 15. The bit stream BS_H of the high band which was received, demodulated, and error corrected is outputted from the ECC decoder 16. Those bit streams are supplied to a source decoder 17. The source decoder 17 executes a decoding process corresponding to the encoding (for instance, MPEG) performed in the source encoder 2. In the source decoder 17, either one of a state where both of the hierarchy of the middle low band data and the hierarchy of the high band data are used and a state where only the hierarchy of the middle low band data is used is adaptively selected in accordance with the receiving situation or the like. A digital audio signal is taken out to an output terminal 18 from the source decoder 17.

Figure 3:
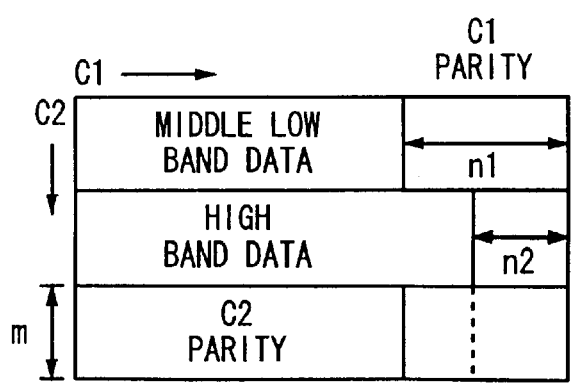
FIG. 3 is a schematic diagram showing a construction of an error correction code according to the embodiment of the invention.

According to an embodiment of the invention, in order to realize the foregoing graceful degradation, the audio data is divided into a plurality of frequency components so as to have a hierarchical structure and, further, correcting abilities of the error correction encoding processes which are executed by the ECC encoders 3 and 4 are made different between the two frequency components. FIG. 3 shows an example of a method of making the error correcting abilities different. FIG. 3 relates to the example of using a product code such that a predetermined number of samples of the encoded digital audio signal are two-dimensionally arranged and the encoding of the error correction code is executed in each of the horizontal and vertical directions. An error correction code other than the product code can be also used.

As shown in FIG. 3, in case of two-dimensionally arranging the predetermined number of samples of the bit stream from the source encoder, the middle low band data and the high band data are divided in the vertical direction and are arranged. The middle low band data and the high band data are arranged in a matrix having a plurality of rows and a plurality of columns, respectively. The encoding of an error correction code (C2) in the vertical direction is commonly performed to the middle low band data and the high band data, so that (m) C2 parities are formed.

The encoding of an error correction code (C1) in the horizontal direction is performed to the middle low band data, so that (nl) C1 parities are formed. The encoding of the C1 code is also executed to the high band data, so that (n2) (n2<nl) C1 parities are formed. Further, the encoding of the C1 code is performed to the C2 parities, so that (nl) C1 parities are formed. The number of C1 parities can be also set to n2 as shown by a broken line.

Although the above example relates to the case of performing the C2 encoding and, subsequently, executing the C1 encoding, those encoding processes can be also performed in accordance with the reverse order. In this case, the C2 encoding is executed to the C1 parities.

The error correction code such as a Reed Solomon code or the like can be also used as error correction codes C1 and C2. In case of the error correction code, it is not limited to the Reed Solomon code and the number of error symbols which can be corrected increases as the number of parities is large. In other words, the error correcting ability increases. As shown in FIG. 3, therefore, the middle low band data encoded so as to further increase the number of C1 parities is more powerful for the errors as compared with the high band data. Thus, when the C/N ratio of the digital broadcasting decreases, the number of errors of the high band data first increases and when the C/N ratio further decreases, the number of errors of the middle low band data also increases.

On the reception side, either one of a mode of using both of the hierarchy data of the middle low band data and the high band data and a mode of using only the middle low band data is adaptively selected in accordance with the receiving situation (specifically speaking, the C/N ratio) due to the errors or the like on the transmission path. As will be described hereinafter, in the case of transmitting the audio data through the network, the hierarchy data to be used is instructed in accordance with the data transmission amount of the transmission path or the data processing ability on the reception side. For example, the receiving situation can be detected with reference to the error information when performing the error correction on the reception side. Since significance of the middle low band data is higher than that of the high band data when reproducing audio sound, if only the middle low band data is used in association with the decrease in C/N ratio or the like, the graceful degradation can be realized.

Figure 1A:
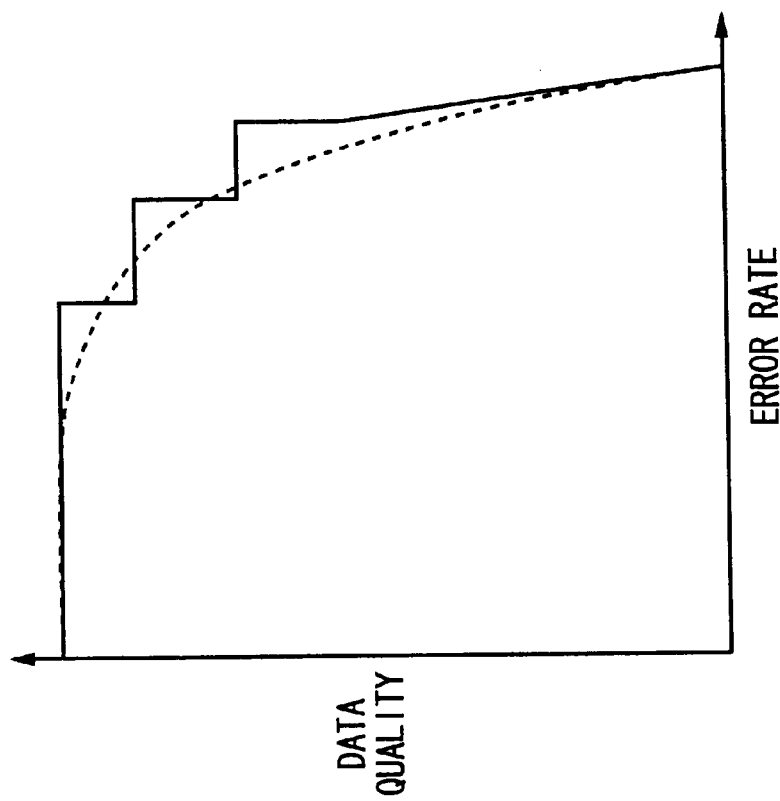
FIGS. 1A and 1B are schematic diagrams showing characteristics of a conventional digital broadcasting and characteristics of the invention, respectively.
Figure 1B:
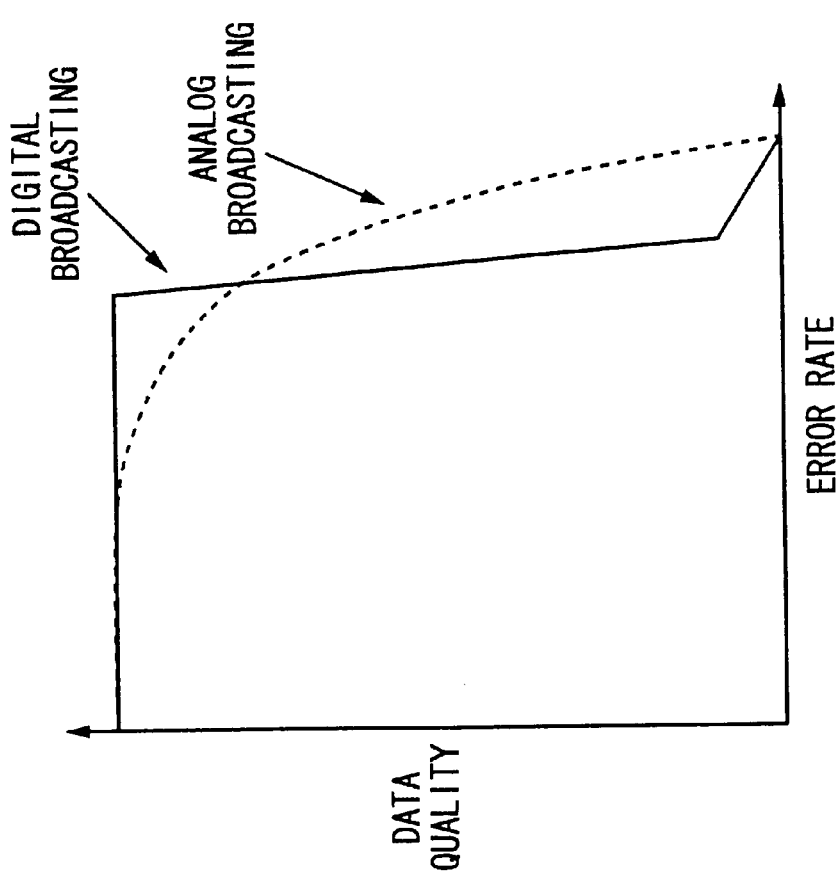
Figure 4A:
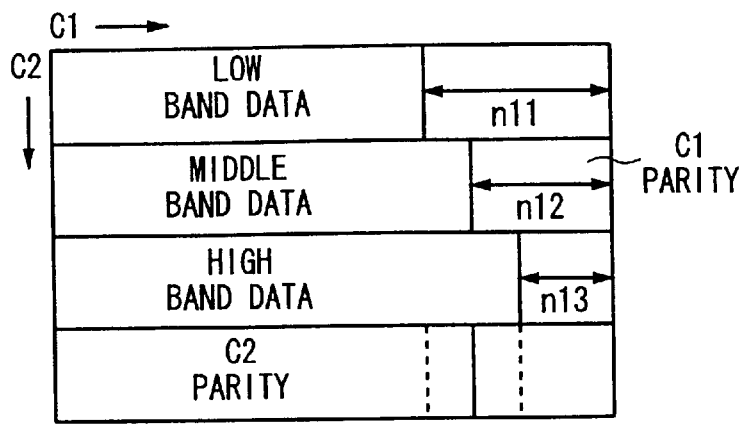
FIGS. 4A, 4B, and 4C are schematic diagrams showing several examples of error correction codes, respectively.
Figure 4B:
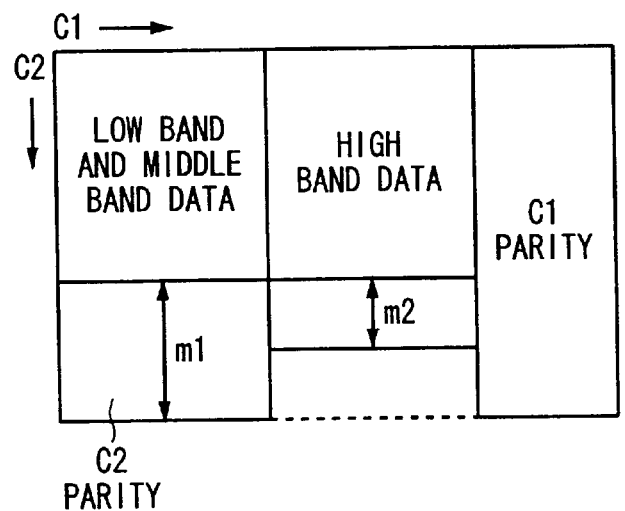
Figure 4C:
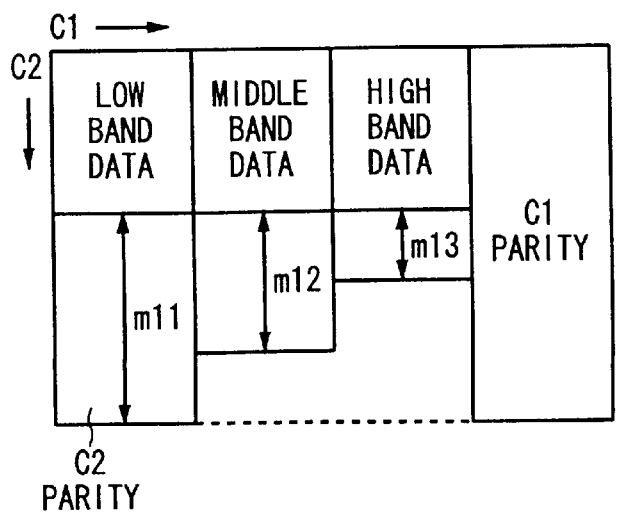

FIGS. 4A to 4C show other several examples of a method of making the error correcting abilities different. FIG. 4A relates to the example in which the numbers of C1 parities are made different in accordance with the hierarchy data and the data is divided into three hierarchies of the low band, middle band, and high band. Now, assuming that the number of C1 parities regarding the hierarchy of the low band data is equal to n11 and the number of C1 parities regarding the hierarchy of the middle band data is equal to n12 and the number of C1 parities regarding the hierarchy of the high band data is equal to n13, there are relations of (n11>n12>n13) among them. Thus, it is possible to construct such that when the C/N ratio decreases, the quality of the reproduction audio sound gradually deteriorates as shown in FIG. 1B.

FIGS. 4B and 4C show the examples in which the numbers of parities of the C2 code are made different in accordance with the frequency components, respectively. FIG. 4B relates to the example in which the input audio data is divided into hierarchies of the middle low band data and the high band data and the number ml of C2 parities of the middle low band data whose significance is higher than that of the quality of the audio sound is smaller than the number m2 of C2 parities of the high band data of low significance. FIG. 4C relates to the example in which the data is divided into three hierarchies of the low band, middle band, and high band and the numbers m11, m12, and m13 of C2 parities regarding those hierarchy data are set so as to satisfy the relations of (m11>m12>m13). As mentioned above, as a method other than the method of making the numbers of parities different, the error correcting abilities can be also made different. For example, different kinds of error correction codes can be also used in accordance with the hierarchies.

Figure 5:
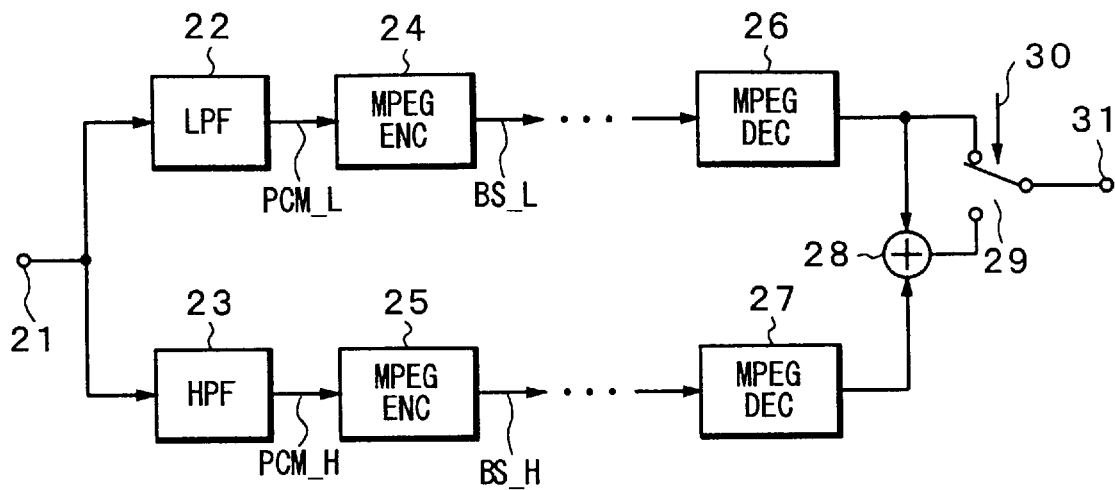
FIG. 5 is a block diagram showing a construction of a source encoder according to the embodiment of the invention.

FIG. 5 shows a constructional example of the source encoder 2 and source decoder 17. The source encoder 2 is constructed by: a low pass filter (LPF) 22 and a high pass filter (HPF) 23 for dividing the digital audio signal from an input terminal 21 to middle low band data PCM_L and high band data PCM_H; an MPEG encoder 24 for encoding the middle low band data from the LPF 22; and an MPEG encoder 25 for encoding the high band data from the HPF 23.

The source decoder 17 is constructed by: an MPEG decoder 26 for decoding the encoded middle low band data BS_L; an MPEG decoder 27 for decoding the encoded high band data BS_H; an adder 28 for adding decoded outputs of the decoders 26 and 27; and a selector 29 for selecting one of the output of the decoder 26 and an output of the adder 28. A decoded digital audio signal is taken out to an output terminal 31 from the selector 29. A control signal 30 to control the selector 29 is formed on the basis of the receiving situation (C/N ratio) or the like or in accordance with an instruction of the user.

Figure 6:
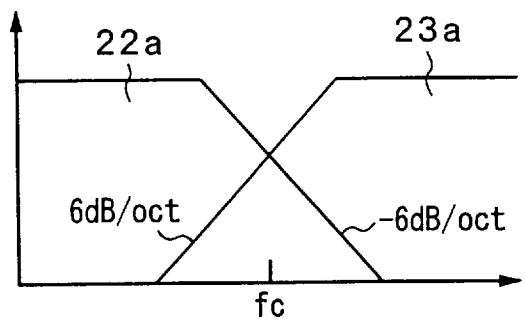
FIG. 6 is a schematic diagram showing characteristics of a filter for frequency division.

FIG. 6 shows characteristics 22a of the LPF 22 and characteristics 23a of the HPF 23. Those characteristics decrease by 3 dB at a frequency fc and an inclination of each characteristics changes at a rate of 6 dB per octave.

Figure 7:
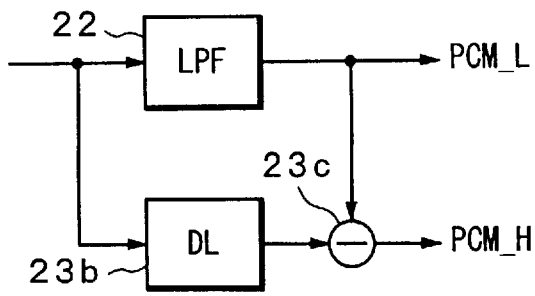
FIG. 7 is a block diagram showing constructional example of the filter for frequency division.

FIG. 7 shows an example of the high pass filter 23. An output of the low pass filter 22 is outputted as middle low band data PCM_L and is supplied to a subtractor 23c and the middle low band data is subtracted from the input data transmitted through a delay circuit 23b, thereby obtaining the high band data PCM_H.

A delay amount of the signal which is caused when the signal passes through the LPF 22 and HPF 23 and enters the MPEG encoders 24 and 25 and the phase of an audio frame to be encoded with respect to one data and those of another data are the same. Encoding conditions such as a compression rate and the like don't need to be equal among the hierarchies. For example, it is also possible to set the bit stream BS_L formed from the middle low band data to 288 kbps and to set the bit stream BS_H formed from the high band data to 96 kbps.

As for the MPEG audio, in case of transferring the digital audio data, a sub-band encoding system is used as an encoding system in order to reduce the data amount. The MPEG encoders 24 and 25 are encoders of the sub-band encoding. The MPEG decoders 26 and 27 are decoders of the sub-band encoding. According to the sub-band encoding system, redundant information is reduced by using an offset nature in the frequency base direction. The MPEG audio encoding system using the sub-band encoding will now be described hereinbelow.

FIG. 8 shows an example of an encoder and a decoder based on the sub-band encoding method of M division. Input audio data is supplied to a decomposing filter 41 comprising (M) band pass filters (BPFs) and down-sampling circuits selected for those filters. The down-sampling circuit sub-samples the data into 1/M. Since the signal band is reduced into 1/M, the down-sampling of 1/M can be realized. An output of each sub-band from the decomposing filter 41 is supplied to a quantizing circuit 42 comprising (M) quantizers and is quantized to data of a predetermined number of bits every sub-band. Outputs of the quantizing circuit 42 are supplied to a packing circuit 43 and are converted to formats of a bit stream.

On the decoder side, the bit stream is supplied to an unpacking circuit 44 and is rearranged to a data train of each sub-band and is supplied to an inversely quantizing circuit 45 comprising (M) inverse quantizers. A synthesizing filter 46 is connected to the inversely quantizing circuit 45. The inversely quantizing circuit 45 executes a process opposite to that of the quantizing circuit 42. The synthesizing filter 46 comprises (M) up-sampling circuits and (M) band pass filters. The up-sampling circuit interpolates the decimated samples. The band pass filter synthesizes the M divided bands to the original band. Decoded audio data is derived from the synthesizing filter 46.

FIG. 9 functionally shows signal processes of the encoder and decoder of the sub-band encoding mentioned above. The input digital audio signal is decomposed to the sub-band data by a decomposing filter bank 51 including down-sampling and a quantizing process 52 is executed. A scale factor calculating process 53 is performed from the sub-band data. A bit allocating process 54 is executed from a scale factor SF. The quantizing process 52 is executed on the basis of the quantization level determined by the bit allocating process 54.

The quantization level is allocated in accordance with the data amount of each sub-band so as to obtain a predetermined data amount as a whole (this process is called a bit allocation). After the data of each sub-band was normalized by the scale factor SF corresponding to the maximum value of each sub-band, it is quantized on the basis of the allocated quantization level. The bit allocation is executed in consideration of characteristics such as minimum audio characteristics of the human auditory sensation or the like. For this purpose, the input digital audio signal is supplied and a psychological auditory sensation model calculating circuit 56 is provided so as to control the bit allocation.

After the quantizing process 52, a formatting process 55 to the bit stream is executed. The scale factor SF of each sub-band and the number of quantization bits (the number of allocation bits) ALLOC are also inserted in the bit stream. The bit stream formed by the formatting process 55 is supplied to the ECC encoder as mentioned above.

After the error correcting process was performed, a decoding process of the subband encoding is executed to the bit stream by the ECC decoder. First, a decoding process 61 of the bit stream is carried out and the bit stream is rearranged to the data train of each sub-band and the scale factor SF and quantization bit number ALLOC in the bit stream are separated. In an inversely quantizing process 62, an inverse quantization is performed by using the scale factor SF and allocation bit number ALLOC. Sub-band data from the inversely quantizing process 62 is synthesized by a synthesizing filter bank 63, so that reconstructed digital audio data is obtained.

Figure 10A:
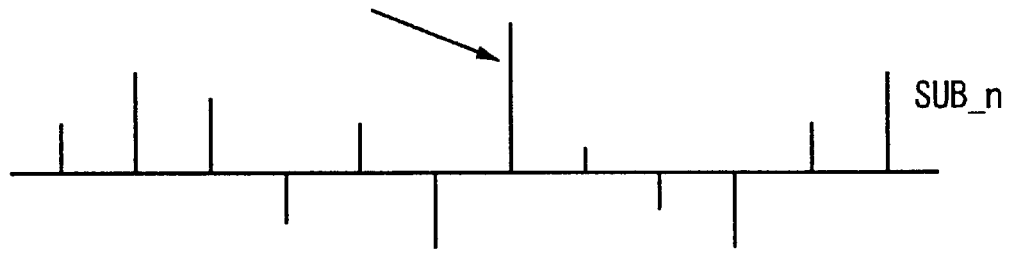
FIGS. 10A, 10B, and 10C are schematic diagrams which are used for explanation of the sub-band encoding.
Figure 10B:
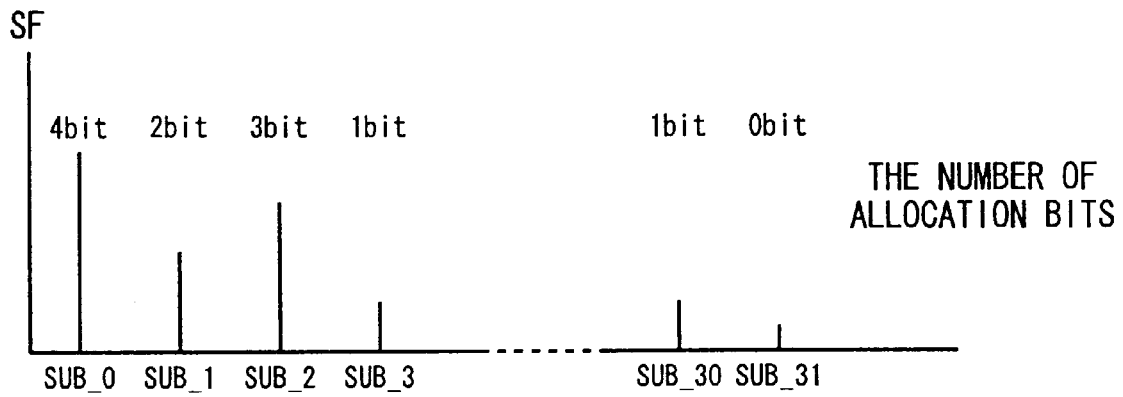
Figure 10C:
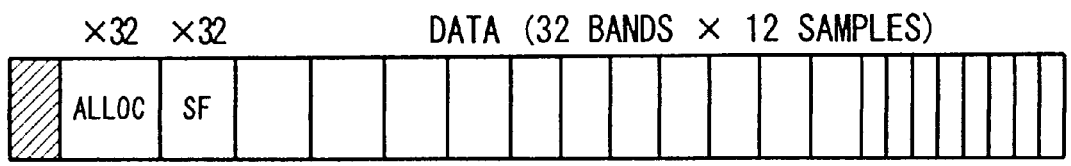

FIGS. 10A to 10C show an encoding process of the sub-band encoding in an example where the dividing number is equal to 32 and a code length is equal to 384 samples. In MPEG layer 1, one processing unit (audio frame length) is equal to 384 samples. The inputted audio data is divided into 32 frequency regions by a dividing filter. The audio data as much as 384 samples is divided into 32 frequency components (sub-bands) and is down-sampled into 1/32, respectively. Thus, one sub-band block is constructed per 12 samples. FIG. 10A shows twelve samples of a certain sub-band SUB_n. The maximum absolute value [sample, for example, Sn(6)] among those samples is set to the scale factor SF (for example, shown by a code of 6 bits) and the values of the other eleven samples are divided by this value and normalized.

The number of quantization bits of each sub-band is decided on the basis of the scale factor SF of each sub-band. FIG. 10B shows an example of the bit allocation. As will be understood from this diagram, in the sub-band of the large scale factor SF, the number of quantization bits which are allocated increases. In case of executing the bit allocation, it is also possible to decide by using not only the value of the scale factor SF but also a psychological auditory sensation model using the nature of the human auditory sensation.

That is, the human auditory sensation has an auditory sensation masking effect and the minimum audio characteristics. The auditory sensation masking effect denotes that the sound at a small level neighboring on the frequency cannot be heard by the sound at a large level. The minimum audio characteristics are characteristics such that the minimum value at a level which can be heard differs depending on the frequency. By using those auditory sensation natures, even if the transmission of the sound which cannot be heard is omitted or the number of quantization bits which are allocated to the sound that is difficult to be heard is reduced, deterioration of the quality of the reproduced audio sound is small. By using the auditory sensation characteristics as mentioned above, the transmission data amount can be compressed.

Each sub-band data is quantized on the basis of the quantization level which is instructed by the allocation bit number ALLOC allocated and is formatted to the bit stream as shown in FIG. 10C. FIG. 10C shows one audio frame. A header (for example, two bytes) to transmit side information such as a state of the code or the like is positioned at the head. Subsequently, the quantization bit number ALLOC (4 bits×32) indicative of the allocation bit number of each sub-band is located. After that, the scale factor SF (6 bits×32) of each sub-band is located. Further, data (32×12 samples) is located after that. The data is arranged in accordance with the order of the frequencies from the low frequency to the high frequency.

Although the data of 32 bands is inherently transmitted, by allocating the bits to only the subbands of the number corresponding to the data amount (AMOUNT) are allocated from the band of the low band, the data amount can be further reduced due to the balance with the deterioration of the sound quality by the frequency limitation. The compression rate of the code is determined by the total number of allocation bits at the time of the quantization.

Figure 11:
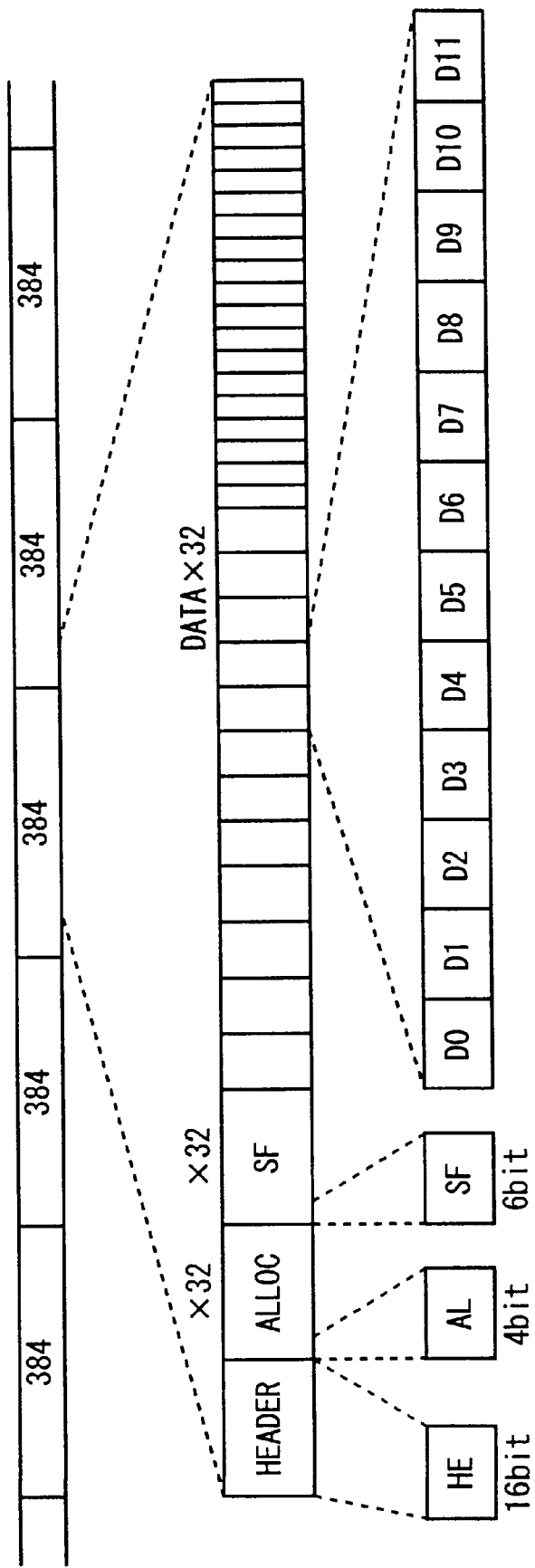
FIG. 11 is a schematic diagram showing an example of a bit stream.

FIG. 11 shows a constructional example of the bit stream in case of controlling the transmission cod e amount. The information (ALLOC) indicative of the number of quantization bits allocated to each sub-band data at the time of the encoding and the information (SF) indicative of the maximum value of the data in each sub-band block are sequentially recorded in each sub-band block by only the number of bands shown in AMOUNT in accordance with the order from the low band. In the data region, the data blocks in which one sub-band is constructed by 12 samples are sequentially recorded in accordance with the bands from the band of a low frequency by only the number of bands shown in AMOUNT.

A header showing the encoding state is added to the head of each block. In the example, information of RATE (4 bits) indicative of the compression rate upon encoding and AMOUNT (the number of bands is shown by 4 bits) indicative of the number of recorded bands is included. The AMOUNT information shows a boundary of hierarchies and is necessary upon decoding. However, it is not always necessary to transmit the AMOUNT information. Actually, the AMOUNT information doesn't exist in the formats of MPEG layers I and II. That is, only the value of ALLOC at the position of the sub-band corresponding to the AMOUNT information is validated. The positions of the other bands are set to values in which the quantization bit amount indicates 0 and are transmitted. On the decoding side, the boundary can be determined by a boundary searching method, which will be explained hereinafter. One block of the bit stream is constructed for one audio frame comprising 384 audio samples. Although the number of bytes of each of the header, ALLOC, and SF has been fixed, the number of bytes in the data region changes depending on the compression rate. In FIG. 11, an example (32) of the number of sub-bands allocated is shown.

Figure 12:
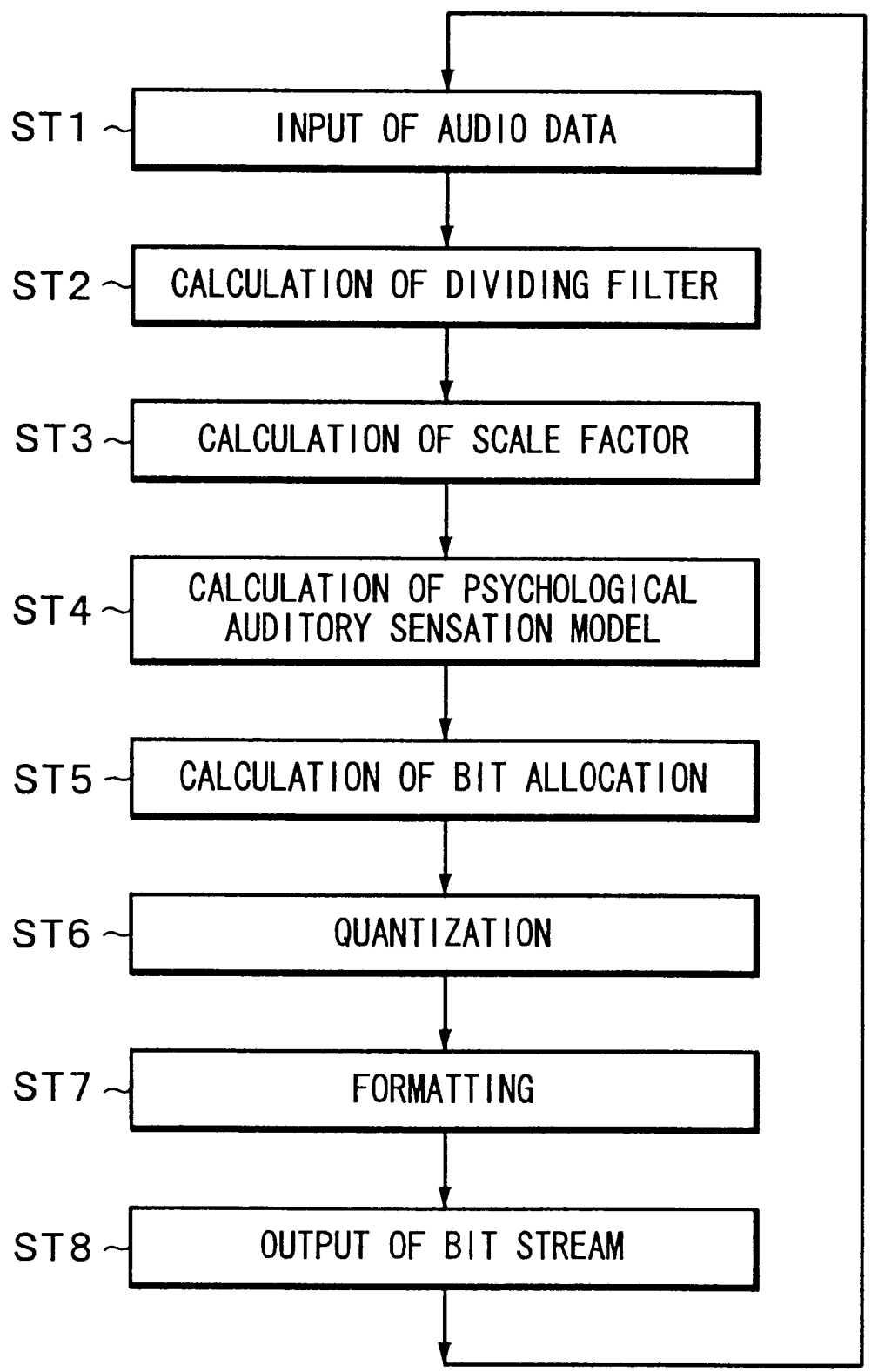
FIG. 12 is a flowchart for explaining the encoding process of the sub-band encoding.
Figure 13:
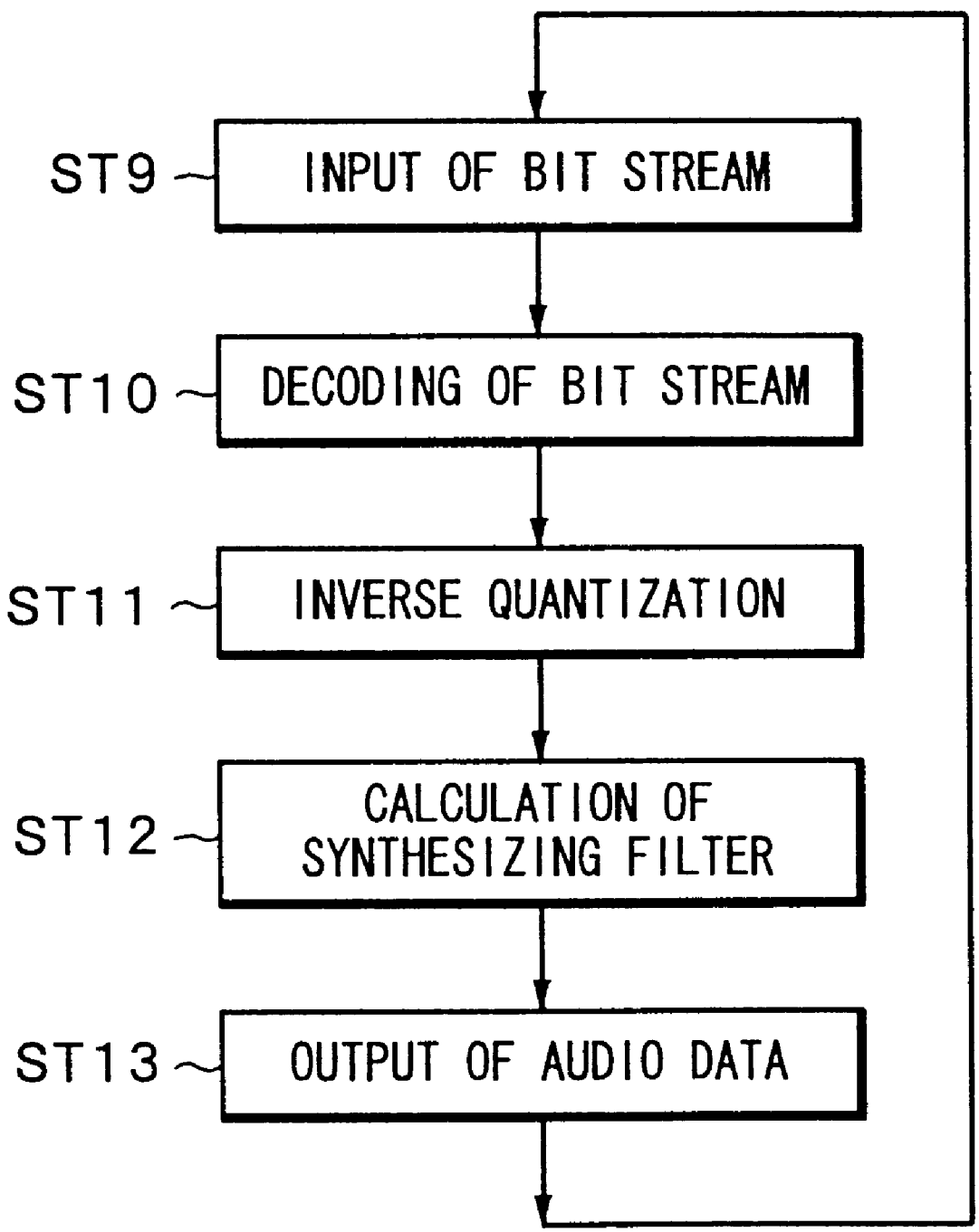
FIG. 13 is flowchart for explaining the decoding process of the sub-band encoding.

FIG. 12 shows an encoding process of MPEG audio layer 1 mentioned above. FIG. 13 shows its decoding process. In this example, a processing loop of one time is constructed by a unit of the encoding block. Now, assuming that a length of encoding block is equal to 384 samples, if the processes of one loop are finished for a time (384 FS: FS denotes a sampling frequency) during which the audio data of 384 samples is inputted, the processes can be continued in a real-time manner.

In the encoding process shown in FIG. 12, an input of the audio data (ST1), a calculation of the dividing filter (ST2), a calculation of the scale factor (ST3), a calculation of the psychological auditory sensation Model (ST4), and a calculation of the bit allocation amount (ST5) are executed. A quantization (ST6) is executed in accordance with the calculated bit allocation amount. A formatting (ST7) is performed and a bit stream is outputted (ST8).

In the decoding process shown in FIG. 13, an input of the bit stream (ST9) is started, a decoding of the bit stream (deformatting) (ST10) is executed, and an inverse quantization (ST11) is performed by using the information (ALLOC) indicative of the number of quantization bits and the information (SF) showing the maximum value of the data in each sub-band block. A calculation of the synthesizing filter (ST12) is executed. An output of the decoded audio data (ST13) is executed.

An encoder block 50 and a decoder block 60 shown by surrounding them by broken lines in FIG. 9 execute the processes shown in FIGS. 12 and 13, respectively. Specifically speaking, each of them is constructed by a DSP (Digital Signal Processor). The encoding processes of two channels can be performed by one DSP or IC (integrated circuit) by a time-division system.

Figure 14:
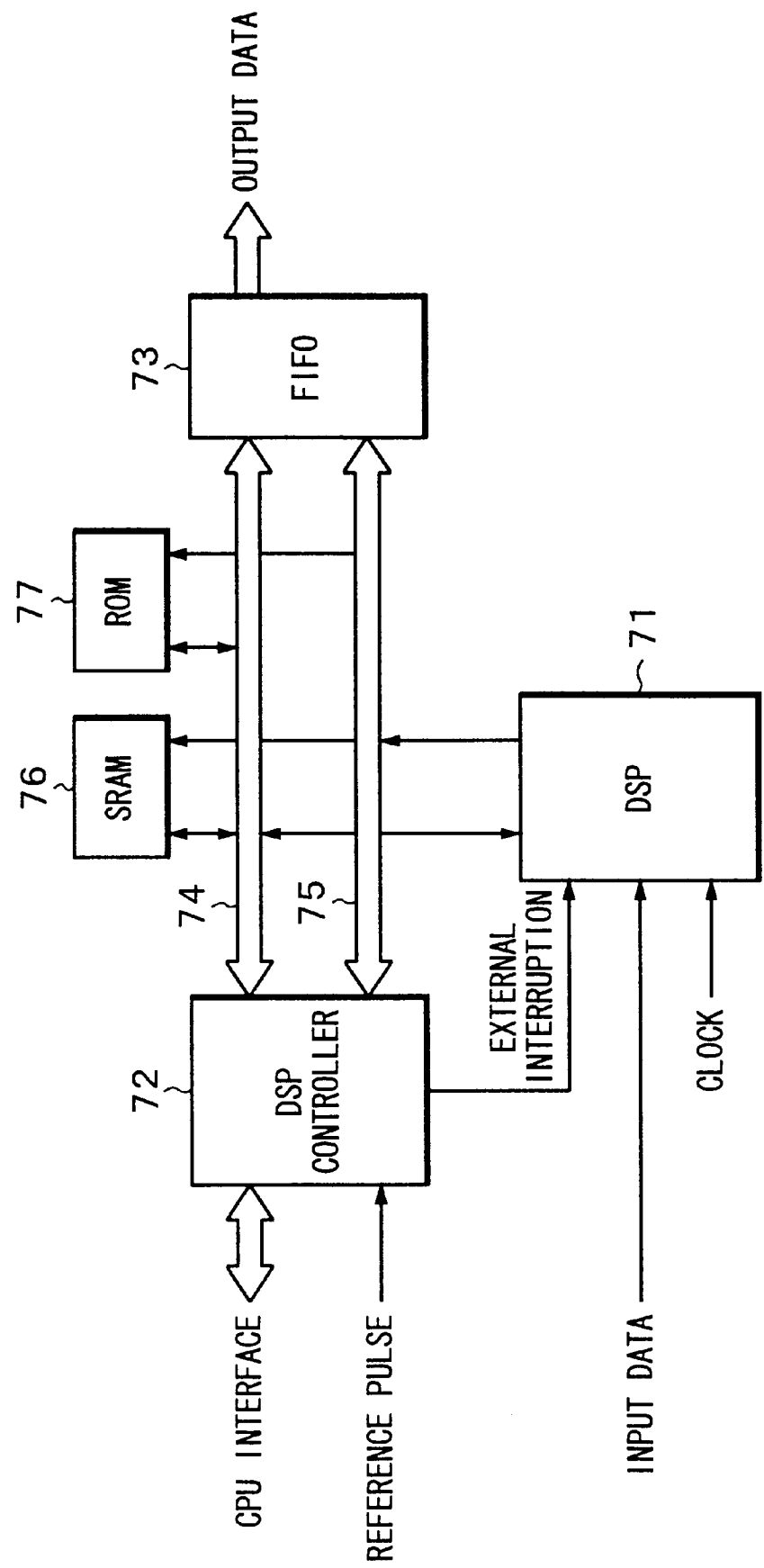
FIG. 14 is a block diagram showing an example of a hardware construction of the encoder and decoder of the sub-band encoding.

FIG. 14 shows a construction of an example in case of constructing the encoder block 50 or decoder block 60 by the DSP. The construction shown in FIG. 14 can function as an encoder and a decoder. Either one of those functions is determined by a program. In FIG. 14, reference numeral 71 denotes a DSP. The input data is supplied as serial data to a serial port of the DSP 71 and clocks are supplied to the DSP 71. Reference numeral 72 denotes a DSP controller which is connected to a CPU interface. A reference pulse is supplied to the DSP controller 72. Reference numeral 73 denotes an FIFO. A data bus 74 and an address bus 75 are provided between the DSP controller 72 and FIFO 73. Output data is taken out from the FIFO 73.

Reference numeral 76 denotes an SRAM as a memory for data and 77 indicates an ROM for storing a program. The DSP 71, SRAM 76, and ROM 77 are coupled to the data bus 74 and address bus 75, respectively. An external interruption to the DSP 71 is performed from the DSP controller 72. For example, the DSP 71 which operates by clocks of 50 MHz is interrupted by using pulses of time intervals as many as 384 samples. When this interruption occurs, the encoding process is executed.

The encoding process will now be described in detail hereinbelow with reference to the flowchart of FIG. 12 and a block diagram of FIG. 14.

(1) Input of the Audio Data (step ST1)

The input audio data is always transferred from the serial port to the external memory (SRAM 76) of the DSP 71 every sample synchronously with the sampling clock. A memory address on the transfer destination side is counted up every sampling clock. In this process, the memory address on the transfer destination side is initially set. The data inputted from the serial port is copied into another work area.

(2) Calculation of the Dividing Filter (step ST2)

The input data is divided into signal components of 32 frequency regions by the dividing filter.

(3) Calculation of the Scale Factor (step ST3)

The maximum value in each sub-band data is detected and a value obtained by encoding the maximum value to six bits is used as a scale factor SF. This process is also executed in a predetermined processing time without depending on the input signal.

(4) Calculation of the Psychological Auditory Sensation Model (step ST4)

Figure 15A:
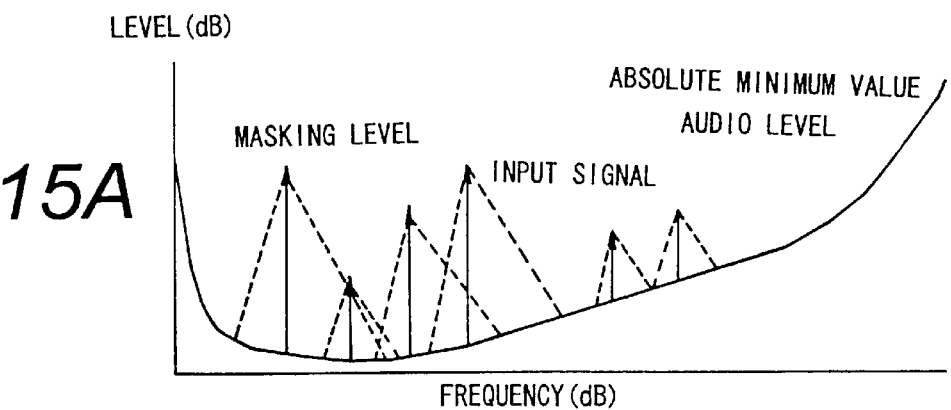
FIGS. 15A, 15B, and 15C are schematic diagrams for explaining calculating methods of a masking level in the sub-band encoding.
Figure 15B:
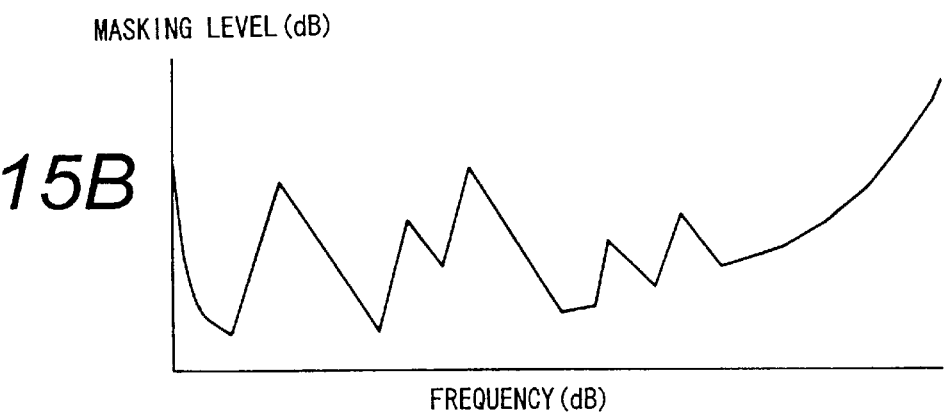
Figure 15C:
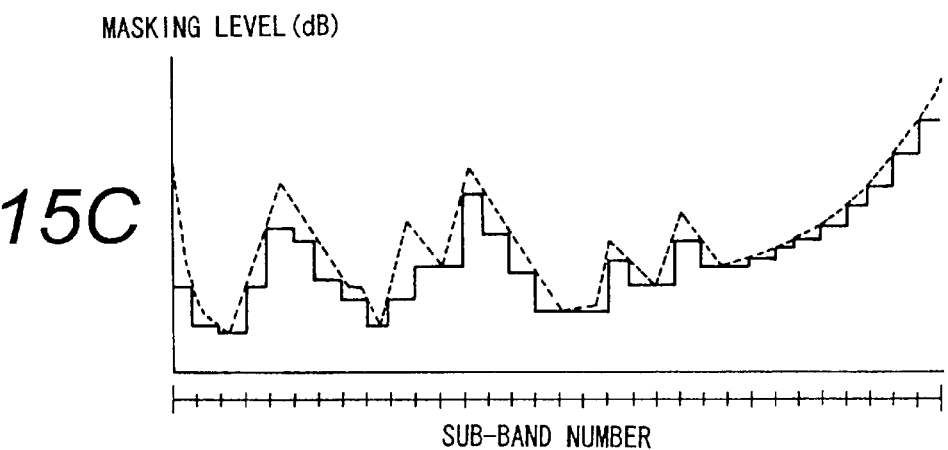

FIGS. 15A to 15C show a flow of the calculation of the masking level by the psychological auditory sensation model. An FFT process of 512 points is executed to the input signal, thereby obtaining an amplitude spectrum (FIG. 15A). In FIG. 15A, characteristics of the absolute minimum audio level are shown by a thin solid line along a frequency base. Regions which exist on both sides of the input signals shown by arrows and in which the masking effect occurs are shown by broken lines.

The level in the human auditory sensation model at which noises are masked is calculated from each frequency component of the input signal (FIG. 15B). Since the frequency components of sound pressures below the masking level cannot be perceived, the bits are allocated to only the input signals of the frequency components exceeding the masking level. Subsequently, as shown in FIG. 15C, the masking level derived in the frequency region is converted into noise masking levels in 32 sub-band regions. By the calculation results in those portions, the bit allocation amount at the post stage is determined.

(5) Calculation of the Bit Allocation Amount (step ST5)

The quantization bit number ALLOC of each sub-band is determined from the noise masking level of each sub-band and a level of the signal. The total number of allocation bits at the time of the quantization changes in dependence on the compression rate of the code.

(6) Quantization (step ST6)

After each sub-band data was normalized by the scale factor, it is quantized by the allocated quantization bit number. The processing time is constant.

(7) Formatting (step ST7)

The encoded data is arranged in a predetermined data train, thereby forming a bit stream.

(8) Output of the Bit Stream (step ST8)

The encoding result is written into the FIFO 73 for outputting.

Subsequently, the processes of the decoder will now be described hereinbelow with reference to the flowchart of FIG. 13 and the block diagram of FIG. 14.

(9) Input of the Bit Stream (step ST9)

The input of the bit stream is continuously or intermittently transferred to the external memory 76 of the DSP 71. The head of the audio frame is detected from the sync signal included in the header.

(10) Decoding of the Bit Stream (step ST10)

The scale factor of each band, the quantization bit number, and the data are obtained from the bit stream.

(11) Inverse Quantization (step ST11)

The quantized data of each band is converted into the sub-band data by the scale factor and the allocated quantization bit number.

(12) Calculation of the Synthesizing Filter (step ST12)

The 32 sub-band data is synthesized by the synthesizing filter, thereby decoding the reproduction sound.

(13) Output of the Audio Data (step ST13).

The decoded audio data is outputted from the serial port every sample synchronously with the sampling clock.

According to the sub-band encoding system used in the MPEG audio mentioned above, since the hierarchical operation cannot be performed on the reception side, a system using a hierarchical structure cannot be constructed. According to the embodiment of the invention, the input audio data is divided into the middle low band data PCM_L and high band data PCM_H and each frequency component is encoded by the MPEG encoders 24 and 25, respectively, thereby realizing the hierarchy encoding.

In the foregoing embodiment, in order to process two hierarchical structures, the circuits or processing ability which is twice as large as the ordinary ones, the input filter, and the adder at the output stage on the decoder side are necessary. Another embodiment of the invention which improves the above drawback will now be described hereinbelow.

Figure 16:
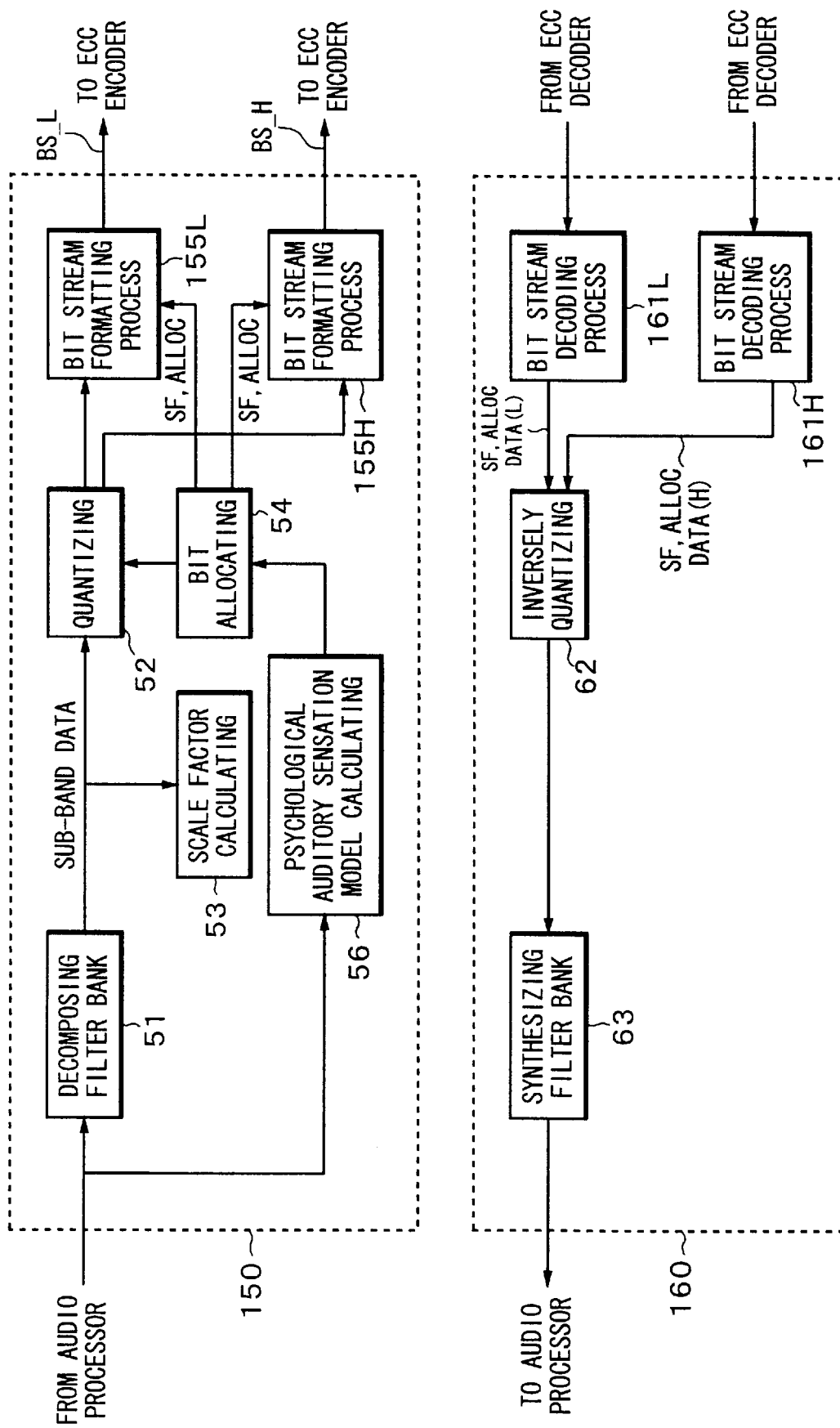
FIG. 16 is a block diagram of an encoder and a decoder according to signal processes in another embodiment of the invention.
Figure 17:
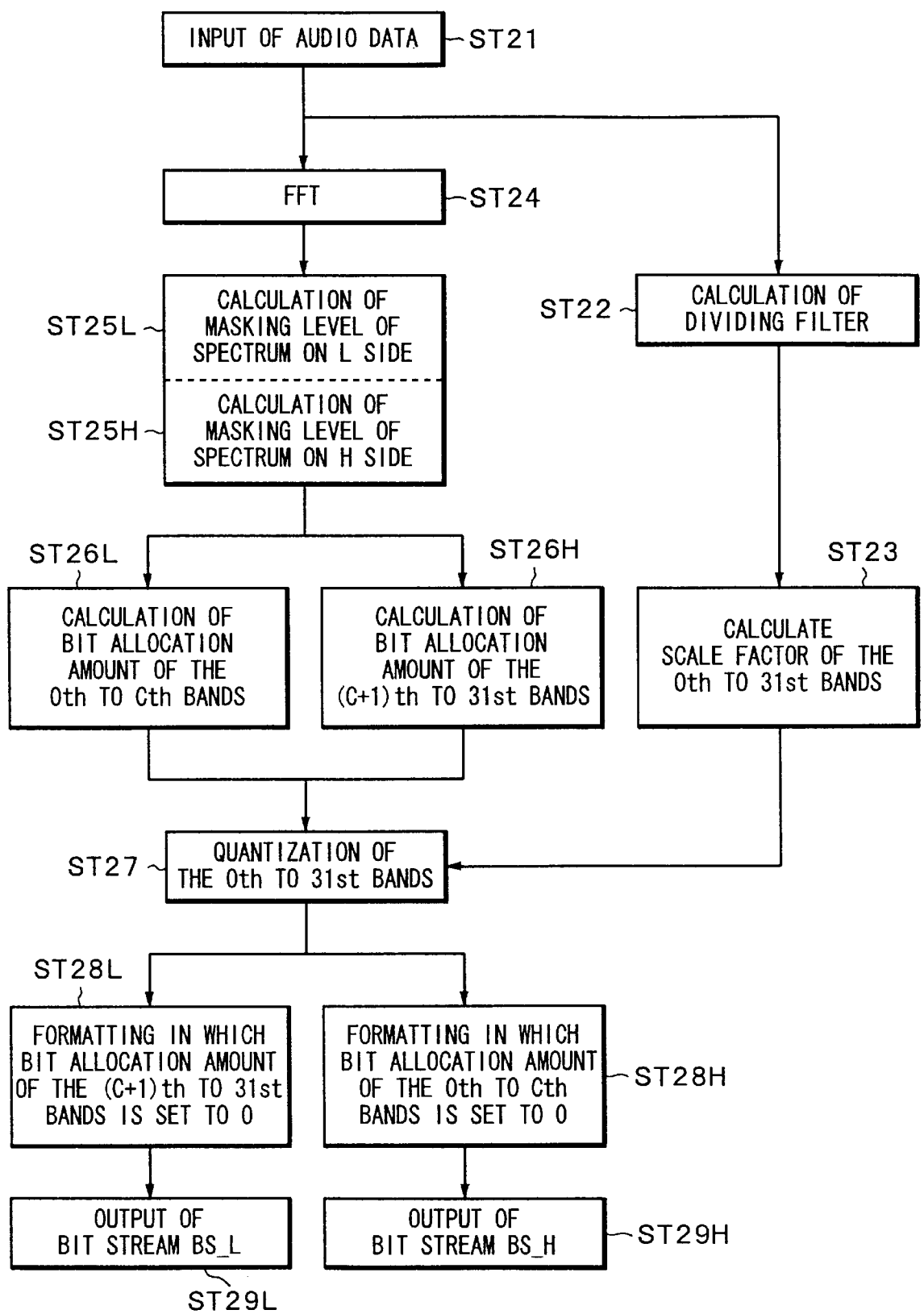
FIG. 17 is a flowchart showing an encoding process according to another embodiment of the invention.
Figures 18A, 18B:
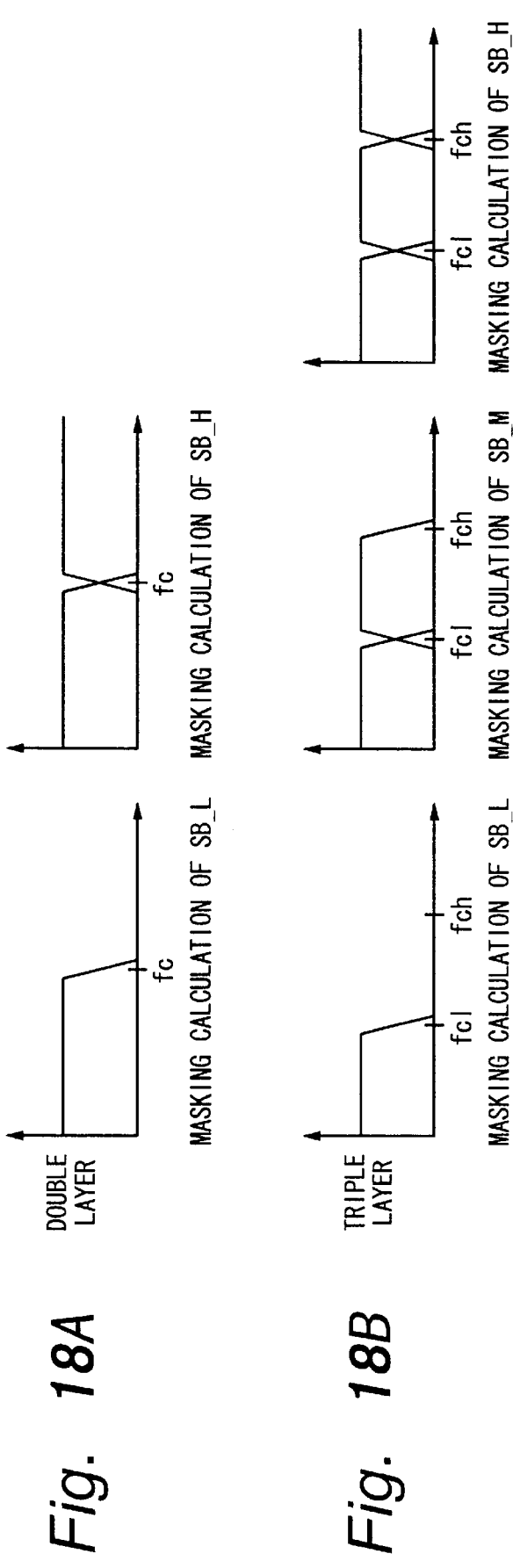
FIGS. 18A and 18B are schematic diagrams for explaining calculating methods of a masking level according to another embodiment of invention.

FIG. 16 shows a construction of an encoder 150 and a decoder 160 of another embodiment of the invention. FIG. 17 is a flowchart showing processes of the encoder. FIGS. 18A and 18B are diagrams for explaining calculations of the masking levels. As will be understood from the construction of FIG. 16, according to another embodiment of the invention, formatting processes 155L and 155H are needed in the encoder 150 and bit stream decoding processes 161L and 161H are necessary in the decoder 160. However, any other construction to be newly added is hardly necessary as compared with the existing encoder and decoder.

The bit stream BS_L of the middle low band data is outputted from the formatting process 155L. The bit stream BS_H of the high band data is outputted from the formatting process 155H. Although not shown, those bit streams are respectively supplied to an ECC encoder in a manner similar to the foregoing embodiment. The ECC encoder executes the encoding process of the error correction code in a manner such that the error correcting ability for the bit stream of the middle low band data is higher than that of the bit stream of the high band data.

In another embodiment, an example of dividing the input audio data into two hierarchy data of the middle low band component and the high band component will now be described. By a process similar to step ST2 (calculation of the dividing filter) in the encoding process shown in FIG. 12, the 32 divided sub-band data is sequentially expressed as SD(O), SD(l), ..., and SD(31) in accordance with the order from the data of a low frequency. In those sub-band data, for instance, the data SD(O) to SD(C) are labeled as hierarchy data SD_L of the middle low band and the data SD(C+1) to SD(31) are labeled as hierarchy data SD_H of the high band. When the sampling frequency is equal to 48 kHz, since a width of one band is set to 750 Hz, the frequency fc at the boundary of the middle low band and the high band is equal to 750×(C+1) Hz. The position of the boundary can be arbitrarily changed by changing the sub-band to be separated.

The bits are allocated to the groups SD_L and SD_H of the two sub-band data divided as mentioned above so as to obtain bit rates which were independently determined, thereby forming two bit streams.

As shown in the flowchart of FIG. 17, when the audio data is inputted (step ST21), the calculation of the dividing filter is executed (step ST22) and the signal components of the 0th to 31st bands are formed. The scale factors of the 0th to 31st bands are calculated (step ST23).

On the other hand, the input audio data is subjected to an FFT process (step ST24). This process relates to an analysis of the frequency components which are necessary for the calculation of the psychological auditory sensation model (calculation of the masking level). The masking level corresponding to each sub-band is calculated. The calculation of the masking level comprises a calculating process of the masking level of the spectrum on the middle low band side (step ST25L) and a calculating process of the masking level of the spectrum on the high band side (step ST25H).

On the reception side, when the reproduction sound is obtained by using only the hierarchy data of the middle low band, since the masking effect by the component of the high band hierarchy is not obtained, there is a possibility such that quantization noises at the boundary between the middle low band and the high band are perceived. The reproduction sound is not derived by using only the hierarchy data of the high band. As shown in FIG. 18A, therefore, when the masking level on the side of the middle low band sub-band data SD_L is calculated, the signal of the high band sub-band data SD_H is processed by regarding that there is no signal. When the masking level on the SD_H side is calculated, the calculation is performed by regarding that there is the signal of SD_L.

The number of hierarchies is not limited to two. For example, as shown in FIG. 18B, at frequencies fcl and fch, the audio signal can be also divided into three components of the low band, middle band, and high band. Further, the encoding conditions of each hierarchy don't need to be identical. When calculating the masking levels in case of the three hierarchies, the masking level of the hierarchy data of the low band is calculated by regarding that the hierarchy data of the middle band and the high band show no-signal. The masking level of the hierarchy data of the middle band is calculated by regarding that the hierarchy data of the high band shows no-signal. Generally, the masking levels when dividing into a plurality of hierarchies are calculated by regarding that the signal of the hierarchy of a frequency higher than that of the hierarchy to be processed shows no-signal. However, in case of calculating the masking level without using the sub-band data of a partial band, an encoding efficiency deteriorates by only an amount that the Masking effect due to the sub-band data of the band which is not used cannot be utilized.

After completion of the calculating process of the masking level, the bit allocation amount is calculated. As shown in steps ST26L and ST26H in FIG. 17, the quantization bit number of each sub-band is determined from the masking level of the sub-band of each hierarchy and the level of the signal so as to obtain a bit rate that has independently been determined every hierarchy. The number of bits which is necessary for side information is also managed every hierarchy. When the number of hierarchies increases, since an amount of side information increases, a whole encoding efficiency decreases.

The 0th to 31th sub-band data are quantized with reference to the scale factors calculated in step ST23 and the bit allocation amount calculated every hierarchy in steps ST26L and ST26H (step ST27).

The formatting process of the bit stream is performed. In this case, in the hierarchy of the middle low band, the bit allocation amounts of the (C+1)th to 31th bands are calculated by regarding as "0" (step ST28L). Similarly, in the hierarchy of the high band, the bit allocation amounts of the 0th to Cth bands are calculated by regarding as "0" (step ST28H). The bit stream BS_L is outputted (step ST29L) and the bit stream BS_H is outputted (step ST29H).

According to the encoding method of another embodiment of the invention mentioned above, the frequency separating filter on the input side is unnecessary and the input of the audio data, the calculation of the dividing filter, the calculation of the scale factor, and the process of the quantization are similar to those of the existing method. Although the data packing processes and the bit stream outputting processes of only the number as many as the number of hierarchy are necessary, an increase in processing amount in a whole processing amount is small. Although it is necessary to slightly change the calculation of the psychological auditory sensation model and the calculation of the bit allocation amounts, the processing amount is almost equal to the conventional one. In case of encoding to two hierarchies, therefore, the increase amount can be suppressed to a few % of the processing amount of the conventional encoder.

In the decoder 160, an error correcting process by an error correcting circuit (not shown) is executed and the bit stream decoding processes 161L and 161H are executed to the bit streams BS_L and BS_H after completion of the error correction. By those processes, the two hierarchy bit streams BS_L and BS_H are unformatted and the quantized values of each sub-band are derived.

The bit stream selecting process is executed at the front stage or in the bit stream decoding processes 161L and 161H. That is, in case of the digital broadcasting, when the receiving situation is good, the two bit streams BS_L and BS_H are selected. When the receiving situation is bad, only the bit stream BS_L on the middle low band side is selected. When the bit stream BS_H is not selected, the sub-band data of the high band which is obtained when decoding the bit stream BS_H is processed as a no-signal.

Figure 19:
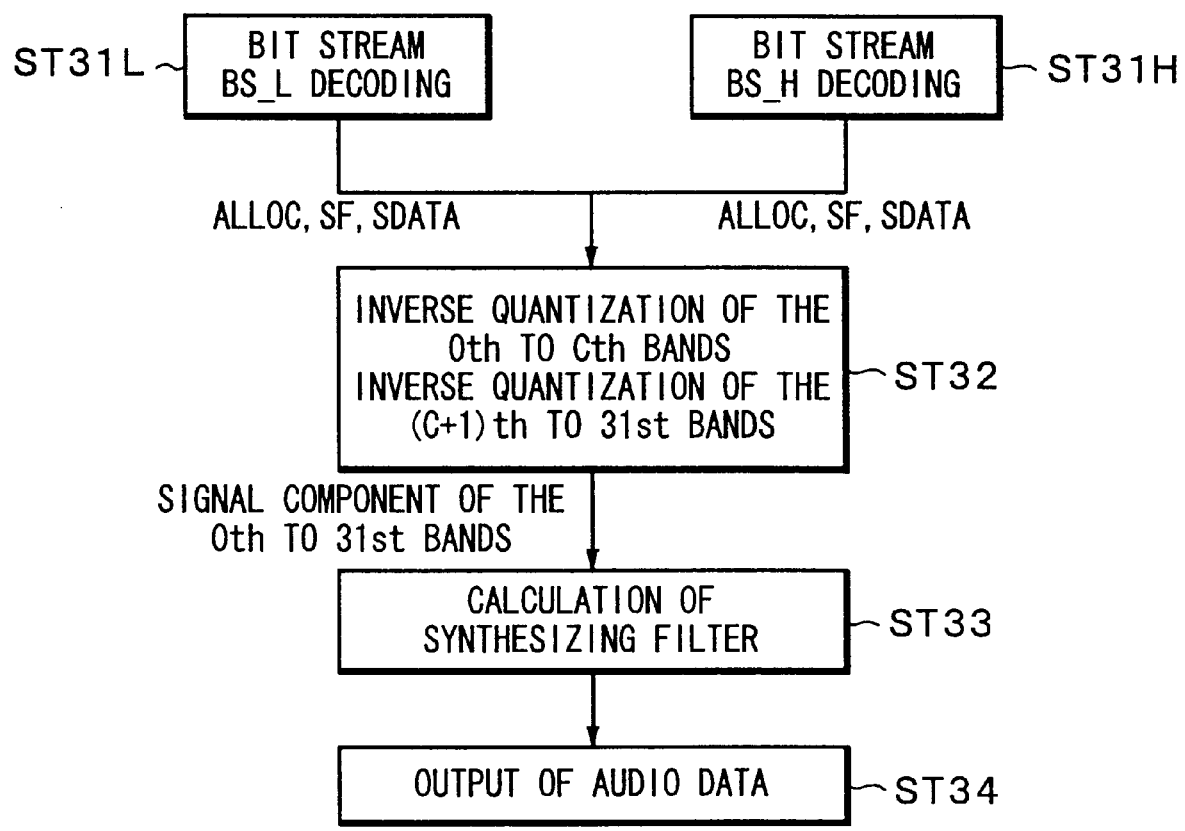
FIG. 19 is a flowchart showing a decoding process according to another embodiment of the invention.

FIG. 19 is a flowchart showing the decoding process. The bit streams are unformatted by the bit stream decoding processes (ST31L and ST31H) and the sub-band data SDATA and side information (scale factor SF, quantization bit number ALLOC) of each of the middle low band layer and the high band layer are separated. In the inversely quantizing process 62 (FIG. 16) and step ST32 (FIG. 19), the sub-band data is inversely quantized by using the side information. That is, by using the side information (scale factor SF, allocation bit number ALLOC) included in the bit stream BS_L of the hierarchy on the middle low band side, the sub-band data of the 0th to Cth bands is respectively inversely quantized. By using the side information (scale factor SF, allocation bit number ALLOC) included in the bit stream BS_H of the hierarchy on the high band side, the sub-band data of the (C+1)th to 31st bands is respectively inversely quantized.

The sub-band data on the middle low side and the sub-band data on the high band side which were obtained by the inverse quantization are processed by the synthesizing filter in the synthesizing filter bank 63 (FIG. 16) and step ST33 (FIG. 19). The data of the reproduction sound is decoded as mentioned above (step ST34).

In the decoding process of another embodiment of the invention mentioned above, the adding process on the output side is unnecessary and the output of the audio data, the calculation of the synthesizing filter, and the inversely quantizing process are the same as those in the existing method. Although the decoding processes of the bit streams of only the number as many as the number of hierarchies are necessary, an increase amount of the processing amount in a whole processing amount is small. Therefore, in case of the decoding of the bit streams of two hierarchies, therefore, the increase amount can be suppressed to a few % of the processing amount of the conventional decoder. According to another embodiment of the invention, the encoding and decoding processes having the hierarchical structure can be executed by the increase of the processing amount of about a few % than that of the conventional one. Therefore, those processes can be realized by the construction using the DSP in a manner similar to the conventional one. The processes according to the presence or absence of the hierarchial structure can be executed by the mode selection by using the same construction.

Figure 20:
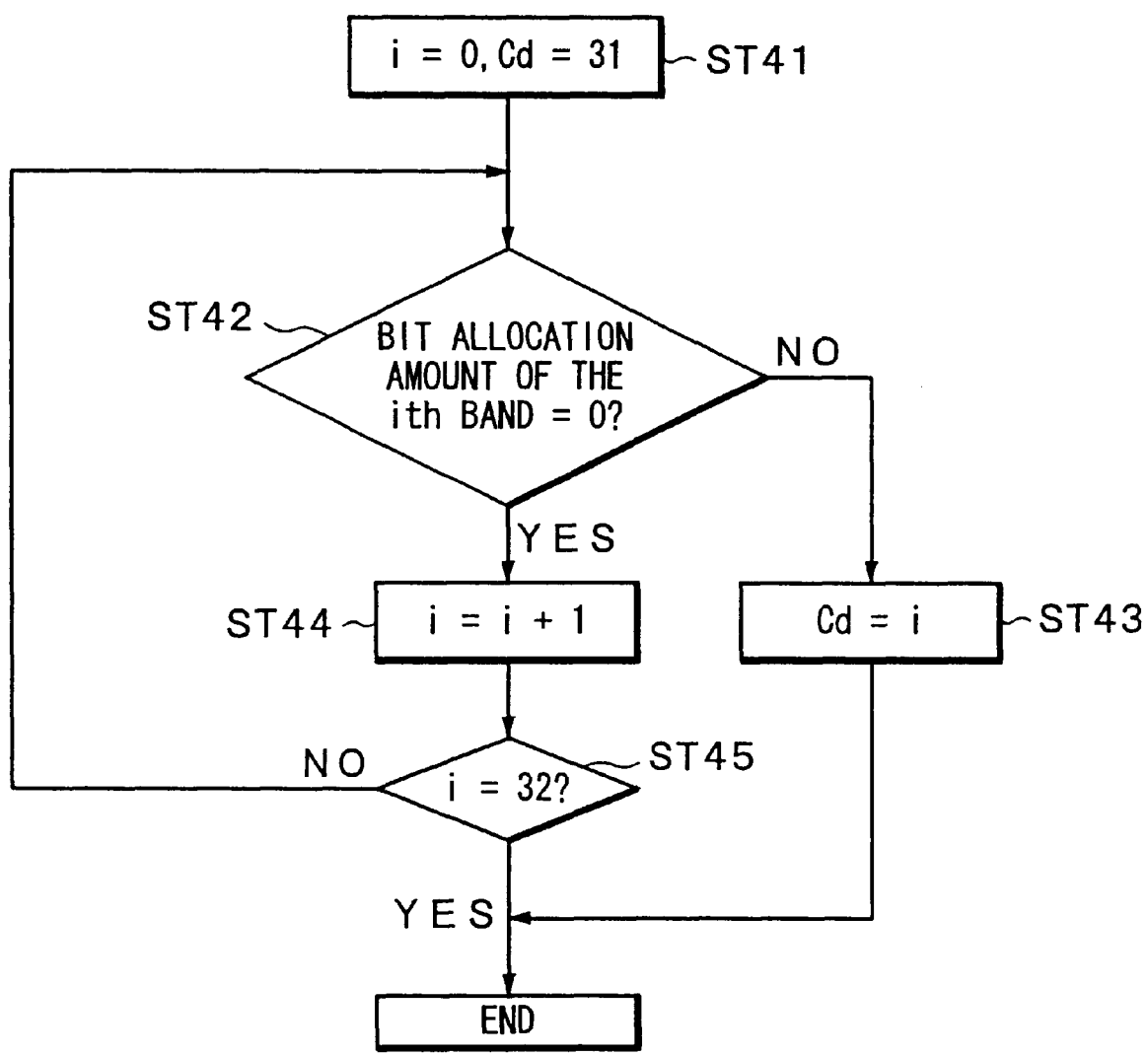
FIG. 20 is a flowchart showing example of a method of determining a boundary position according to another embodiment of the invention.

In the processes of the decoder according to another embodiment of the invention, when the number of hierarchies and a boundary position (sub-band number of the boundary) Cd of the frequency division are not known on the decoder side, it is necessary to search Cd. Although ID data indicative of the number of hierarchies and Cd can be also transmitted, in this case, the side information increases and an encoding efficiency decreases. FIG. 20 is a flowchart showing an example of a process in case of searching the sub-band number Cd of the boundary. The searching process is executed in the decoding process 161H of the bit stream BS_H.

In step ST41 in FIG. 20, an initial setting (i=0, Cd=31) is performed. A check is subsequently made to see if the bit allocation amount of the ith band is equal to 0 (step ST42). In case of the bit stream on the high band side, since the bit allocation amount on the low band side is set to 0, if the bit allocation amount of the ith band is equal to 0, the processing routine advances to step ST44 and the value of i is increased by 1. If the bit allocation amount is not equal to 0, the sub-band number Cd at the boundary is determined to be i (step ST43).

A check is made to see if the increased value of i is equal to 32 (i=32) (step ST45). When the value of i doesn't reach 32, step ST42 follows and the foregoing processes are repeated. When i=32, the processes are finished. By the processes shown in FIG. 20, the sub-band number in which the allocation bit is not equal to 0 is detected from the low frequency side. The detected sub-band number can be recognized as a sub-band number Cd at the boundary.

FIG. 21 is a flowchart showing another method of searching the sub-band number Cd at the boundary on the decoder side. According to another method, the position where the allocation bit is not equal to 0 is detected from the high band side by using the bit-stream BS_L of the low band. According to another example of the searching process, it is executed in the decoding process 161L of the bit stream BS_L. First, (i=31, Cd=31) are set (step ST51).

A check is made to see if the bit allocation amount of the ith sub-band is equal to 0 (step ST52). In case of the bit stream BS_L, the bit allocation amount on the high band side is equal to 0. Therefore, when the bit allocation amount is not equal to 0, Cd=i (step ST53). If the bit allocation amount is equal to 0, the value of i is decreased by 1 (i−1) (step ST54). A check is made to see if i=0. When i # 0, the processing routine is returned to step ST52 and the foregoing processes are repeated.

FIG. 22 is a diagram for explaining the sub-band number at the boundary. An axis of abscissa denotes the numbers of the 0th to 31st sub-bands and an axis of ordinate indicates the allocation bit (ALLOC). In the encoding process, as shown in FIG. 22A, the allocation bit for each sub-band is determined. The sub-band number at the boundary in the encoding process is set to Ce.

Figure 22A:
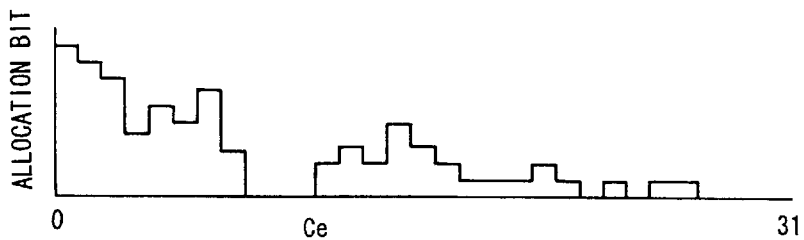
FIGS. 22A to 22D are schematic diagrams which are used for explanation of the methods of determining the boundary position according to another embodiment of the invention.
Figure 22B:
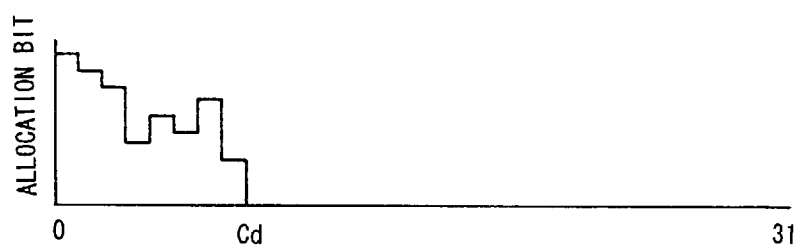
Figure 22C:
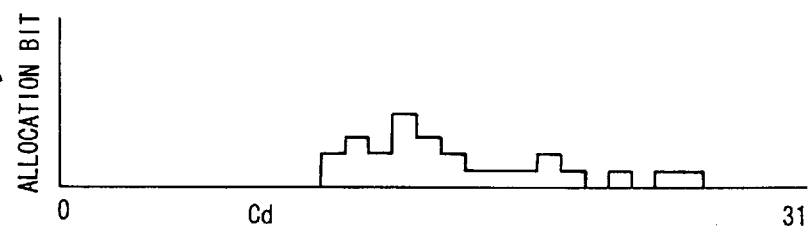
Figure 22D:
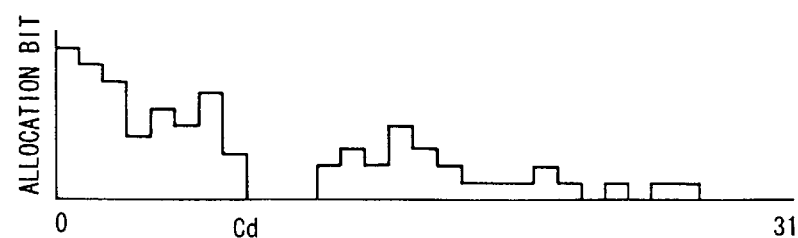

When the bit stream BS_L of the middle low band is decoded, the sub-band number Cd at the boundary is obtained as shown in FIG. 22B. As shown in FIG. 22C, when the bit-stream BS_H on the high band side is decoded, the sub-band number Cd at the boundary is deviated to Ce at the time of the encoding. In this case, since the allocation bit number between Cd and Ce is equal to 0, the decoding process is not influenced.

On the decoder side, it is also possible to decode the streams of the hierarchical structure by using a plurality of decoders in a manner similar to the embodiment and to add results of the decoding.

Figure 23:
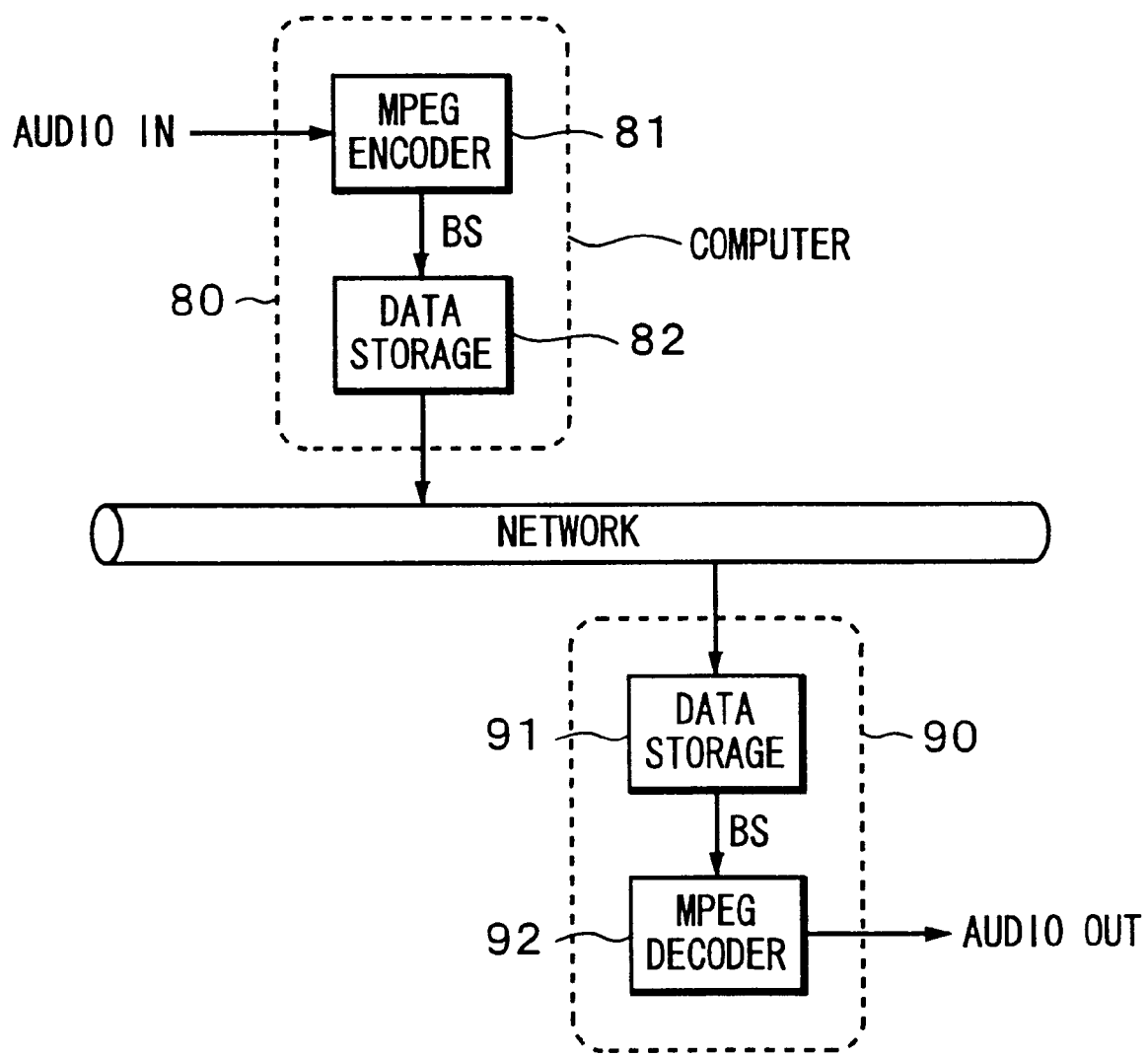
FIG. 23 is a block diagram showing a system construction according to still another embodiment of the invention.

Although the above embodiment has been described with respect to the example in which the invention is applied to the transmission side system and the reception side system of the digital broadcasting, the invention can be also applied to a data transfer between computers connected through a network. FIG. 23 shows a constructional example of a system in which the invention is applied to such a data transfer.

In FIG. 23, a computer 80 and a computer 90 are coupled through a network. The computer 80 includes: an MPEG encoder 81 to which a digital audio signal is inputted and which executes an encoding based on the sub-band encoding as mentioned above: and a data storage 82 in which a bit stream BS from the MPEG encoder 81 is accumulated. The bit stream is sent from the data storage 82 to the network. The bit stream has a hierarchical structure by processes similar to the processes according to the embodiment or another embodiment of the invention mentioned above.

The bit stream transferred through the network is stored into a data storage 91 of the computer 90. The bit stream BS from the data storage 91 is supplied to an MPEG decoder 92 and decoded. A decoded audio signal is derived from the MPEG decoder 92.

In the system shown in FIG. 23, the computer 80 detects a degree of busy state of the network on the basis of a time which is required until a reply of the computer 90 on the reception side is returned via the network or the like. In accordance with the busy degree of the network, the hierarchy to be used is selected and the hierarchy to be selected is instructed to the computer 90 on the reception side. For example, in case of three hierarchies, when the network is not busy, the use of the data of all of the hierarchies is instructed to the reception side. When the network is in a middle busy state, the use of the data of the hierarchies of the low band and the middle band is instructed to the reception side. Further, when the network is busy, the use of only the data of the hierarchy of the low band is instructed to the reception side. As mentioned above, the hierarchy to be used is selected in accordance with the busy situation of the network.

In the system shown in FIG. 23, each of the computers 80 and 90 has signal processing ability which is necessary to execute real-time processes. However, if an enough amount of data cannot be transmitted because the network is busy, the computer 90 cannot execute the decoding process until the data of a predetermined amount or more is not accumulated in the data storage 91. Thus, the reproduced audio sound becomes intermittent. On the other hand, in case of applying the invention, the busy state of the network is detected and the hierarchy to be used is selected in accordance with the degree of the busy state. Consequently, even if the network is busy, the deterioration of the quality of the reproduction audio sound can be prevented.

In the system of FIG. 23 mentioned above, it is assumed that the computer on the reception side has enough real-time processing ability. However, when the processing ability of the computer on the reception side is not relatively high, it is also possible to use only partial hierarchies in accordance with the processing ability instead of using all of the hierarchies.

Although the example in which the invention is applied to MPEG audio layer 1 has been described above, similar processes can be also executed in the transmission of other audio codes. For example, it is also possible to use an encoding such that an audio signal is separated to a plurality of frequency components and each frequency component is encoded by the DCT (Discrete Cosine Transform).

According to the invention, since the audio compression code such as MPEG audio can be divided into hierarchies, the hierarchy to be decoded is adaptively selected in accordance with the receiving situation on the reception side, the degree of busy state of the network, the processing ability on the reception side, or the like, so that the reproduction sound with little deterioration can be obtained.

According to the invention, by forming a plurality of hierarchies and making the error correcting abilities different in accordance with the hierarchies, the graceful degradation can be realized in case of the digital broadcasting.

Further, according to another embodiment of the invention, in case of the sub-band encoding, by performing the frequency separation by the sub-band components, the increase in processes other than the bit stream formatting processes can be suppressed.

The present invention is not limited to the foregoing embodiments but many modifications and variations are possible within the spirit and scope of the appended claims of the invention.

What is claimed is:

1. An audio signal encoding apparatus comprising:

means for separating an input audio signal into a plurality of hierarchical data on a frequency basis;

a plurality of encoding means for respectively encoding said plurality of hierarchial data; and error correction encoding means for adding an error correction code to an output of each of said plurality of encoding means, wherein said error correction encoding means increases error correcting ability of error correction encoding for a low frequency band side of said hierarchical data as compared to that for a high frequency band side of said hierarchical data and wherein said error correction encoding means adds a first type of error correction code to the low frequency band side of said hierarchical data and adds a second type of error correction code which is different from the first type of error correction code to the high frequency band side of said hierarchical data.

2. An audio signal encoding method comprising the steps of:

separating an input audio signal into a plurality of hierarchical data on a frequency basis;

respectively encoding said plurality of hierarchical data by a plurality of encoding means; and performing error correction encoding by adding an error correction code to an output of each of said plurality of encoding means, wherein in said error correction encoding step, the error correcting ability of said error correction encoding for a low frequency band side of said hierarchical data is raised higher than that for a high frequency band side of said hierarchical data, and a first type of error correction code is added to the low frequency band side of said hierarchical data and a second type of error correction code which is different from the first type of error correction code is added to the high frequency band side of said hierarchical data.

* * * * *